United States Patent
Eriksson et al.

(10) Patent No.: US 10,469,491 B2
(45) Date of Patent: Nov. 5, 2019

(54) ACCESS CONTROL IN AN INFORMATION CENTRIC NETWORK

(71) Applicant: Telefonaktiebolaget L M Ericsson (publ), Stockholm (SE)

(72) Inventors: Anders E. Eriksson, Kista (SE); Börje Ohlman, Bromma (SE); Göran Selander, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 130 days.

(21) Appl. No.: 14/899,426

(22) PCT Filed: Jun. 28, 2013

(86) PCT No.: PCT/SE2013/050828
§ 371 (c)(1),
(2) Date: Dec. 17, 2015

(87) PCT Pub. No.: WO2014/209193
PCT Pub. Date: Dec. 31, 2014

(65) Prior Publication Data
US 2016/0149913 A1  May 26, 2016

(51) Int. Cl.
*H04L 29/06* (2006.01)
*H04L 29/08* (2006.01)
*G06F 21/62* (2013.01)

(52) U.S. Cl.
CPC ...... *H04L 63/0876* (2013.01); *G06F 21/6218* (2013.01); *H04L 63/102* (2013.01);
(Continued)

(58) Field of Classification Search
CPC ............. G06F 21/6218; H04L 63/0876; H04L 63/102; H04L 63/061; H04L 63/164; H04L 67/2842; H04L 67/2852; H04L 21/6218
(Continued)

(56) References Cited

U.S. PATENT DOCUMENTS 8,122,479 B2 *  2/2012  Britt ............... H04N 7/1675
                                                        725/93
8,965,845 B2 *  2/2015  Calo ................. G06F 16/27
                                                        707/610
(Continued)

FOREIGN PATENT DOCUMENTS

EP  2 574 009 A2  3/2013

OTHER PUBLICATIONS

Access Control Enforcement Delegation for Information-Centric Networking Architectures by Nikos Fotiou et al. (Helsinki, Finland), Aug. 17, 2012.
(Continued)

*Primary Examiner* — Oleg Korsak
*Assistant Examiner* — Feliciano S Mejia
(74) *Attorney, Agent, or Firm* — Baker Botts, LLP

(57) ABSTRACT

A node (17, 21) in an information centric network (ICN) receives a first identifier associated with an information object. The node (17, 21) causes creation of a virtual node (18) in the ICN, for holding a mapping between a second identifier and the first identifier. The second identifier is assigned to a copy of the information object stored in the ICN. The node (17, 21) causes creation of the virtual node (18) such that the mapping is arranged to cease after a predetermined event. The virtual node (18) is created with the sole purpose of providing copies of the information object to a small number of requestors (14), and possibly to just one requestor (14). Ceasing the mapping after delivery of the one copy, or the few copies, of the information object prevents unauthorized retrieval of the information object.

14 Claims, 13 Drawing Sheets

(52) U.S. Cl.
CPC ...... *H04L 67/2842* (2013.01); *H04L 67/2852* (2013.01); *H04L 63/061* (2013.01); *H04L 63/164* (2013.01)

(58) Field of Classification Search
USPC ...... 726/6; 709/217, 218; 719/315–316, 332
See application file for complete search history.

(56) References Cited

U.S. PATENT DOCUMENTS

| | | | | |
|---|---|---|---|---|
| 9,021,478 | B1* | 4/2015 | Wan | G06F 9/455 |
| | | | | 718/1 |
| 9,374,440 | B2* | 6/2016 | Ko | H04L 67/327 |
| 9,456,054 | B2* | 9/2016 | Jacobson | G06F 15/173 |
| 9,722,867 | B2* | 8/2017 | Zhang | H04L 47/785 |
| 2010/0037298 | A1* | 2/2010 | Lottin | H04L 29/12594 |
| | | | | 726/4 |
| 2011/0286459 | A1* | 11/2011 | Rembarz | H04L 61/106 |
| | | | | 370/392 |
| 2013/0210388 | A1* | 8/2013 | Li | H04W 12/12 |
| | | | | 455/411 |
| 2014/0173018 | A1* | 6/2014 | Westphal | H04L 41/0823 |
| | | | | 709/213 |

OTHER PUBLICATIONS

Named Data Networking (NDN) Project 2010-2011 Progress Summary; Principal Investigators: Lixia Zhang et al., 2010-2011.
International Search Report for International application No. PCT/SE2013/050828, dated Apr. 23, 2014.

* cited by examiner

ACCESS CONTROL IN AN INFORMATION CENTRIC NETWORK

PRIORITY

This nonprovisional application is a U.S. National Stage Filing under 35 U.S.C. § 371 of International Patent Application Serial No. PCT/SE2013/050828, filed Jun. 28, 2013, and entitled "Access Control In An Information Centric Network".

TECHNICAL FIELD

The present invention relates to access control in a network, in particular to access control in a network that uses information-centric networking.

BACKGROUND

The Internet has grown up based on host-based addressing. A user who wishes to retrieve an information object such as a document, a multimedia file etc over the Internet will typically do this using a domain name that identifies a site from where the desired information object may be retrieved. The domain name entered by the user is converted to an Internet Protocol (IP) address by a domain name server, and this IP address identifies a particular host, such as a server, that can provide the requested information object. The request for the information object is then routed to the host identified by the IP address. In host-based addressing, an information object is essentially tied to a physical location—that is to the physical location of the host that stores that information object.

Information-centric networking (ICN) provides an alternative approach to addressing. Information-centric networking (ICN) is a field which includes a number of approaches such as Named Data Networking (NDN) or Content-Centric Networking (CCN), Network of Information (NetInf), PSIRP/PURSUIT, and Data Oriented Networking (DONA). In ICN, each information object is given a globally unique identifier (or globally unique "name"), and a request for an information object uses this globally unique identifier. All copies of a particular information object stored in a network are identified by the same globally unique identifier, and all copies of an information object identified by the same globally unique identifier are regarded as equally valid. A request for a specific information object will include the unique identifier of the requested information object, and when a network receives the request it needs to locate a copy of the requested information object and set up a path, from the source node (i.e. the node holding the selected copy) to the requesting node, over which the information object can be transported to the requesting node. To be able to do this, the network needs to be able to map the identifier of the information object to a locator of the selected source node. The locator is used for routing in the underlying transport network. Mapping the identifier of the information object to a locator of the selected source node is performed by some type of Name Resolution Server (NRS).

In some cases an entity that provides information objects (such an entity will be referred to as a "publisher") may wish to enforce access controls, so that a particular information object is available only to specific recipients. For example a publisher may wish to make an information object available only to requestors who have paid the publisher for the information object (for example where the information is a film or other item of entertainment such as an E-book). If a party pays a publisher to obtain a particular information object the party will learn the unique identifier of that information object and, in the absence of access controls, the party could then pass the unique identifier to third parties and so make it possible for the third parties to obtain the information object without making payment to the publisher.

There have been proposals how to implement an access control policy in ICN. One proposal is that an information owner attaches to every information item a pointer to a function that implements the access control policy that protects that item, rather than the policy itself. Any purveyor can challenge an item requestor to invoke that function, and based on the function's output, the purveyor can decide whether or not the requestor is eligible to access the protected item. The use of encryption mechanisms to provide access control has also been proposed.

The "Handle System" as described in IETF Request for Comments RFC 3650 Handle System Overview provides a general purpose global name service that allows secured name resolution and administration over networks such as the Internet. Most handle data stored in the Handle System is publicly accessible, unless otherwise specified by the handle administrator. Handle administrators may choose to mark handle values that contain private information as readable only by the handle administrator(s), or to store these as encrypted handle values so that these values can only be read within a controlled audience. The handle system uses an eight-bit bit-mask for access control of the handle value. This mask is carried with the content. Access control to handle values is defined in terms of read, write, and execute permissions, applicable to either general public or handle administrator(s).

Currently proposed access control methods for ICN are generally not completely satisfactory. As outlined above many existing access control methods are intrinsically based on cryptographic mechanisms and thereby they require associated key management, and distribution of keys to every new party that wishes to retrieve an information object. A further disadvantage of encryption-based access control methods is that different copies of the same information object may be given different identifiers, but this is contrary to the basic principle of ICN that every copy of an information object should have the same identifier.

Access control methods that use passwords involve all the known weaknesses of password-based authentication methods, and also require distribution of access control lists. For example, there is the risk that the passwords can be stolen if someone hacks into a node in which passwords are stored.

Access control methods that use access control lists have the further disadvantage that, when new parties are granted access to an information object, it is necessary to update the access control lists at each node holding a copy of the access control lists. Alternatively, each node needs to be connected to an access control server so that a node can check each request against the current access control list held at the access control server.

SUMMARY

A first aspect of the invention provides a method of controlling access to an information object in an information centric network (ICN). In the method, a first identifier associated with the information object is received at a node in the ICN, for example at a name resolution server or a virtual node manager in the ICN. The node causes creation (also known as instantiation) of a virtual node in the ICN. The virtual node is for holding a mapping between a second identifier and the first identifier, where the second identifier is assigned to a copy of the information object stored in the ICN. The node causes creation of the virtual node such that the mapping between the second identifier and the first identifier is arranged to cease after a predetermined event.

It should be noted that the virtual node may be created before or after the first identifier is received at the node. It would be possible for the virtual node to be instantiated by the node, and for the temporary identifier to be created, before the node has received the first identifier of the information object. The virtual node would then be held idle until the node has received the first identifier of the information object, at which point the virtual node is then activated, and the mapping between the second identifier and the first identifier is then generated (either by the node or by the virtual node). Alternatively, it would be possible for the virtual node to be instantiated by the node before the node has received the first identifier of the information object. The virtual node would then be held idle until the node has received the first identifier of the information object, at which point the virtual node is activated, and the second (temporary) identifier is created and the mapping between the second identifier and the first identifier is generated (either by the node or by the virtual node).

The mapping between the second identifier and the first identifier may be generated by the node, and installed in the virtual node by the node. Alternatively, mapping between the second identifier and the first identifier may be generated by the virtual node.

The method may further comprise the node receiving a request containing information identifying the information object (which may be, but is not limited to, the second identifier), from a customer who has contracted with a publisher of the information object to purchase a copy of the information object. The node may transmit to the customer, in response to the request, information identifying the virtual node.

In this aspect of the invention the node in the ICN causes the instantiation of a virtual node that is instantiated with the sole purpose of providing copies of a specific information object to a small number of requestors, and possibly to provide a copy of the information object to just one requestor. A customer wishing to purchase the information object is never sent the locator of a real node holding the copy to be accessed, but instead is provided with information identifying the virtual node, such as a locator and/or an identifier of the virtual node. This provides an advantage that unauthorised retrieval of the information object can be prevented, because the mapping between the second identifier and the first identifier will cease after the virtual node has delivered the one copy, or the few copies, of the information object. The second identifier may be considered as a temporary identifier for the information object, since it is valid only for as long as the mapping lasts.

Furthermore, even when the second identifier is assigned to the copy of information object, the first identifier, which is the "normal" identifier of the information object, also remains associated with the copy of the information object. The invention thus allows all copies of the information object in the ICN to remain associated with the first identifier, and so respects the fundamental principle of an ICN that all copies of a particular information object stored in a network are identified by the same globally unique identifier (ie, by the first identifier).

A further advantage of the present invention is that it provides protection against a denial of service attack. Where the name or address of a real node that contains an information object is publically advertised, it is possible for a third party to mount a denial of service attack by directing a large number of requests to the node in a short time, such that the node is unable to deal with the requests. In the present invention however the locator or identifier of the real node holding the copy of the information object is not made public, so it is not possible for a third party to mount a denial of service attack against the real node. Furthermore, the fact that the mapping between the second identifier and the first identifier ceases, or is ceased, after the virtual node has provided a predetermined number of copies of the information object means that any denial of service attack mounted against the virtual node using the second identifier will have minimal effect.

The node may receive the first identifier associated with the information object from a publisher of the information object, or from a broker representing the publisher. The node responds (after it has assigned the second identifier to the copy of the information object) by transmitting the second identifier to the publisher.

The second identifier may be assigned to the copy of the information object by the node. The node may transmit the second identifier to the publisher or broker.

Alternatively, the second identifier may be assigned to the copy of the information object by the virtual node.

The node may additionally generate authentication information based on access control information for the information object. This authentication information is transmitted to the publisher with the second identifier. When the name resolution server receives the request containing the information identifying the information object from the customer, it determines whether the request contains the authentication information or information derived therefrom. The node sends the customer the information identifying the virtual node only if it makes a positive determination (ie, determines that the request also contains the authentication information or information derived therefrom).

The node may receive the access control information together with the first identifier.

The node may cause creation of the virtual node such that the virtual node is arranged to terminate once the predetermined event occurs. Termination of the virtual node is one way of achieving cessation of the mapping between the second identifier and the first identifier. In this embodiment, when the virtual node terminates the node may then cause creation of a new virtual node to supply one or more further copies of the information object with the new virtual node holding a mapping between a new temporary identifier (ie, the "second identifier") and the first identifier. (As with the original mapping, the new mapping may be generated either by the node or by the virtual node.) In this embodiment the virtual node is arranged to self-destruct once the predetermined event has occurred, and this completely prevents reuse the locator/identifier of the virtual node since the virtual node no longer exists. It also protects against denial of service attacks, since a third party who has become aware of the identifier or locator of a virtual node that is no longer in existence cannot use this information to mount a denial of service attack.

Alternatively the node may cause creation of the virtual node such that, upon cessation of the mapping between the second identifier and the first identifier, a mapping between a third identifier and the first identifier is held in the virtual node. The third identifier is assigned to the copy of the information object, but is different to the second identifier. (The mapping between the third identifier and the first identifier may be generated either by the node or by the virtual node.) This avoids the need to instantiate a new virtual node when the mapping between the second identifier and the first identifier ceases, and is effective to prevent re-use of the second identifier to obtain unauthorised copies of the information object since the virtual node no longer holds the mapping between the second identifier and the first identifier. However, it is possible for a party who has become aware of the identifier/locator of the virtual node to attempt at least in principle to obtain a copy of the information object from the virtual node, or alternatively to mount a denial of service attack against the virtual node.

A second aspect of the invention provides a method of controlling access to an information object in an information centric network (ICN). A first identifier is associated with the information object. In this method a virtual node in the ICN holds a mapping between a second identifier and the first identifier. The second identifier has been assigned to a copy of the information object that is stored in the ICN. When the virtual node receives a request for a copy of the information object from a requesting party, the request including the second identifier, the virtual node determines the first identifier using the mapping. The virtual node sends a request for a copy of the information object to a second node in the ICN, where a copy of the information object has previously been cached. Upon completion of a predetermined event, the mapping between the second identifier and the first identifier terminates.

The virtual node may receive the mapping between the second identifier and the first identifier from a name resolution server. Alternatively, the virtual node may generate the mapping between the second identifier and the first identifier.

Upon receipt at the virtual node of a copy of the information object from the second node, the virtual node may forward the copy of the information object from the virtual node to the requesting party. In principle, however, the second node (at which the copy of the information object is cached) could forward a copy of the information object to the requesting party via a route that did not involve the virtual node.

The virtual node may receive, from the name resolution server, authentication information relating to the second identifier. When the virtual node receives the request for the copy of the information object, it may determine whether the request includes the authentication information or information derived therefrom. The virtual node forwards the request for a copy of the information object to the second node only in the event of a positive determination.

The virtual node may terminate upon completion of the predetermined event, thereby causing the mapping between the second identifier and the first identifier to cease.

Alternatively, upon completion of the predetermined event, the virtual node may receive, for example from the name resolution server, or may generate itself, a mapping between a third identifier and the first identifier. The third identifier is different to the second identifier and was assigned to the copy of the information object by the name resolution server. The new mapping replaces the original mapping between the second identifier and the first identifier, and so causes the mapping between the second identifier and the first identifier to cease The predetermined event may be the fulfillment by the virtual node of a predetermined number of requests for the information object that include the second identifier. For example the mapping between the second identifier and the first identifier may terminate after the virtual node has fulfilled a single request (that includes the second identifier) for the information object—ie, after the virtual node has supplied a copy of the information object to a single requesting party. This prevents any reuse of the second identifier, although this embodiment may be resource-intensive since it requires a new identifier to be assigned to the information object, and a new mapping to be set up, for every request for the information object (and also to instantiate a new virtual node for every request in an embodiment in which the virtual node is also terminated). Alternatively it may provide sufficient protection against re-use if the mapping terminates after a plurality of requests that includes the second identifier have been fulfilled—particularly where there is high demand for the information object this may provide sufficient protection against unauthorised retrieval of the information object, since the multiple requests can be expected to be received in a short time after which the mapping will terminate.

Alternatively the predetermined event may be the receipt at the virtual node of a predetermined number of acknowledgements of an end-of-file message. Such an acknowledgement is sent by the consumer when it has received the last field of the message containing the Information Object, and receipt of this acknowledgement at the virtual node informs the virtual node that the copy of the Information Object has been received by the consumer Alternatively, the predetermined event may be the elapse of a predetermined period of time after creation of the virtual node.

A third aspect of the invention provides a method of controlling access to an information object in an information centric network (ICN). In this aspect a publisher node for the information object, or a broker node acting on behalf of the publisher, sends a copy of the information object for storage at a first node in the ICN. The publisher or broker node then sends a first identifier associated with the information object to a second node in the ICN, such as a name resolution server or virtual node manager in the ICN. The publisher or broker node subsequently receives a second identifier—this may be received from the second node, for example where the second node is a name resolution server, or it may be received from another node. The second identifier is the subject of a mapping between the second identifier and the first identifier, which mapping is arranged to cease after a predetermined event. When the publisher or broker node receives a request for a copy of the information object, it sends the second identifier to the requesting party.

The term "publisher node" as used herein refer generally to a node that is making copies of the information object available, for example for purchase, to potential customers. It is not necessary that the publisher node was responsible for the creation of the information object.

The publisher or broker node may further send access control information relating to the information object to the second node.

The publisher or broker node may receive, from the name resolution server, authentication information relating to the information object.

A fourth aspect of the invention provides a network node for controlling access to an information object in an information centric network (ICN). The network node is adapted to receive a first identifier associated with the information object. The network node then causes creation of a virtual node in the ICN, the virtual node containing a mapping between a second identifier and the first identifier. The second identifier is assigned to a copy of the information object that is stored in the ICN. The network node causes creation of the virtual node such that the mapping between the second identifier and the first identifier is arranged to cease after a predetermined event.

The network node may further receive a request identifying the information object. In response to the request, the network node may transmit information identifying the virtual node.

The first identifier associated with the information object may be received from a publisher of the information object, or from a broker acting on behalf of the publisher.

The network node may be adapted to assign the second identifier to the copy of the information object, and transmit the second identifier to the publisher or broker.

The network node may generate authentication information based on access control information for the information object and transmit the authentication information to the publisher or broker with the second identifier. It may further determine whether the request identifying the information object also contains the authentication information, or contains information derived therefrom, and transmit the information identifying the virtual node only if it makes a positive determination.

The network node may be adapted to receive the access control information with the first identifier.

The network node may cause creation of the virtual node such that the virtual node is arranged to terminate after the predetermined event.

The network node may cease the mapping between the second identifier and the first identifier by installing a mapping between a third identifier and the first identifier in the virtual node. The third identifier is assigned to the copy of the information object and is different to the second identifier.

The predetermined event may be the fulfillment by the virtual node of a predetermined number of requests for the information object, or may be receipt at the virtual node of a predetermined number of acknowledgements of receipt of an end-of-file message.

Alternatively the predetermined event may be the elapse of a predetermined period of time after creation of the virtual node.

A fifth aspect of the invention provides a virtual node for controlling access to an information object in an information centric network (ICN). A first identifier is associated with the information object, and the virtual node holds a mapping between the first identifier and a second identifier that is assigned to a copy of the information object stored in the ICN. The virtual node receives a request from a requesting party for a copy of the information object, which request includes the second identifier. The virtual node determines the first identifier using the mapping and sends a request for a copy of the information object to a second node in the ICN at which a copy of the information object is cached. Upon completion of a predetermined event, the virtual node terminates the mapping between the second identifier and the first identifier.

The virtual node may receive the mapping between the second identifier and the first identifier from a name resolution server. Alternatively the virtual may generate the mapping between the second identifier and the first identifier.

Upon receipt at the virtual node of a copy of the information object from the second node, the virtual node may forward the copy of the information object from the virtual node to the requesting party.

The virtual node may receive authentication information relating to the second identifier, from the name resolution server. The virtual node may then determine whether the request for the copy of the information object includes the authentication information or information derived therefrom, and may send the request for a copy of the information object to the second node only if it makes a positive determination.

The virtual node may be arranged to cease the mapping between the second identifier and the first identifier by the virtual node terminating.

The virtual node may be adapted to cease the mapping between the second identifier and the first identifier by receiving, for example from the name resolution server, or by generating, a mapping between a third identifier and the first identifier. The third identifier is different to the second identifier and is assigned to the copy of the information object The predetermined event may be the fulfillment by the virtual node of a predetermined number of requests for the information object or receipt at the virtual node of a predetermined number of acknowledgements of receipt of an end-of-file message.

Alternatively the predetermined event may be the elapse of a predetermined period of time after creation of the virtual node (18).

A sixth aspect of the invention provides a publisher or broker node adapted to control access to an information object in an information centric network (ICN). The publisher or broker node sends, or arranges for the sending of, a copy of the information object for storage at a first node in the ICN. The publisher or broker node sends a first identifier associated with the information object to a second node in the ICN. The publisher or broker node receives a second identifier, the second identifier being the subject of a mapping between the second identifier and the first identifier, the mapping being arranged to terminate after a predetermined event. In response to a request from a requesting party for a copy of the information object, the publisher or broker node sends, or arranging for the sending of, the second identifier to the requesting party.

The publisher or broker node may send access control information relating to the information object to the second node.

The publisher or broker node may receive authentication information relating to the information object.

A seventh aspect of the invention provide a computer program comprising computer-readable code which, when executed by a node, causes the node to perform a method according to the first, second or third aspect.

An eighth aspect of the invention provides a computer program product comprising a non-transitory computer readable medium and a computer program of the seventh aspect. The computer program is stored on the non-transitory computer readable medium.

BRIEF DESCRIPTION OF THE DRAWINGS

Preferred embodiments of the present invention will be described by way of illustrative example with reference to the accompanying figures in which.

DETAILED DESCRIPTION

The present invention is described with reference to embodiments in which the Information Object is a film (the movie "Casablanca"), but this is for example only and the invention may be applied with an Information Object that is not a film.

Figure 1:
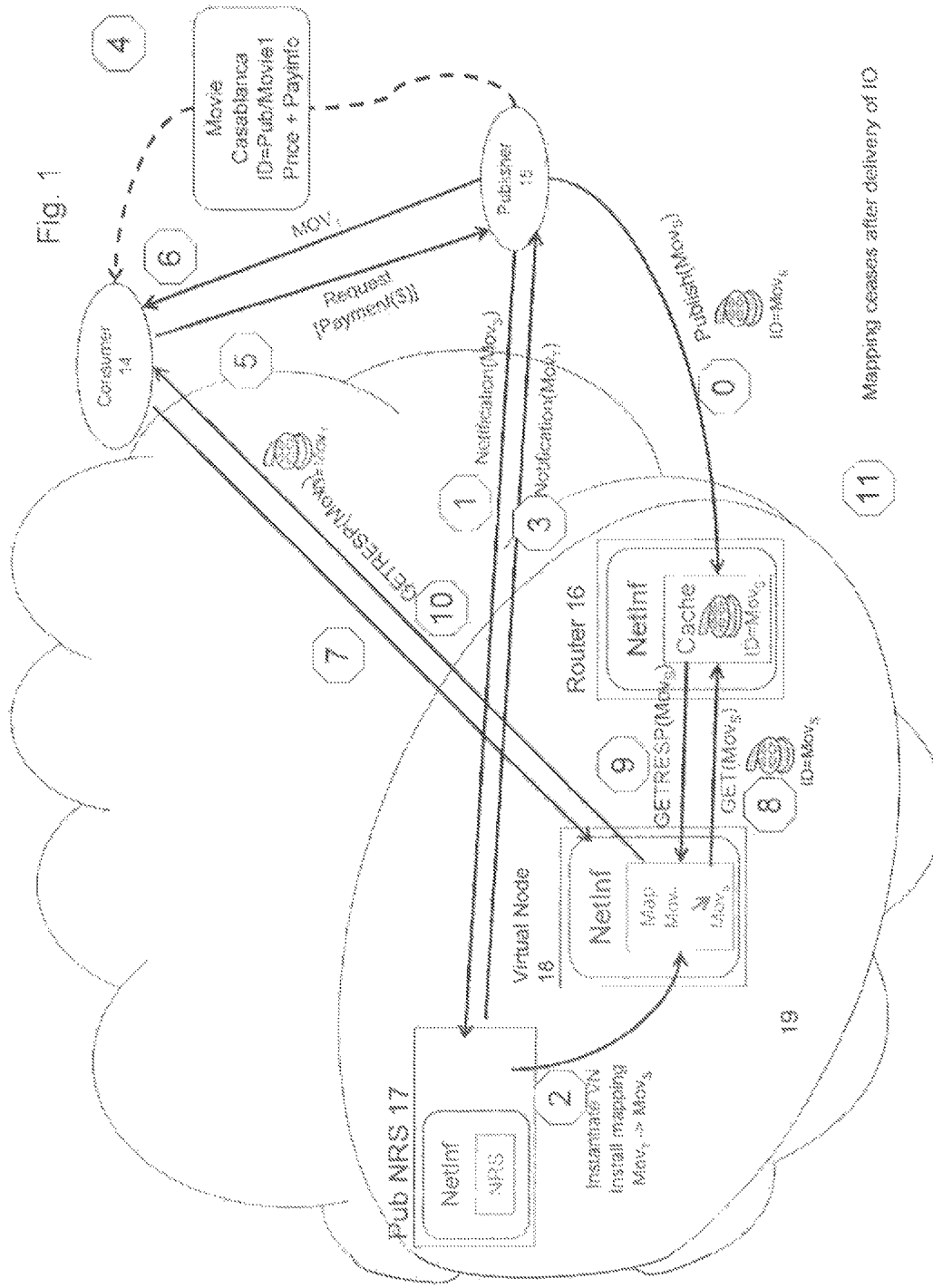
FIG. 1 illustrates a generic network architecture for implementing an embodiment of the present invention.

FIG. 1 a schematic illustration of a generic network architecture for implementing an embodiment of the present invention, and illustrates the principle actions and message flows required to implement the invention.

Initially, publisher 15 wishes to make available to the public a new Information Object, but only under restricted access condition. In the embodiment of FIG. 1, and the other embodiments described herein, the access condition is that the publisher 15 desires that the Information Object is made available only to a consumer who has been granted access rights to receive a copy of the information object. FIG. 1 illustrates a method in which the consumer is granted access rights to receive a copy of the information object in exchange for a payment to the publisher 15, but the invention is not limited to this specific condition for granting access rights.

The publisher 15 posts a copy of the Information Object at a router 16, which caches the copy of the Information Object. The router 16 is preferably located in the domain 19 of the network operator used by the publisher 15. The action of the publisher 15 in caching a copy of the information object at the router 16 is shown as action 0 in FIG. 1.

The Information Object has an identifier MOW The publisher 15 registers the identifier of the Information Object, $MOV_s$, with a name resolution server 17 that is preferably in the same domain that contains the router 16 at which the copy of the Information Object has been cached—and hence that is preferably in the domain 19 of the network operator used by the publisher 15. This is action 1 in FIG. 1, and is identified as "Notification ($MOV_s$)". The publisher 15 also provides the name resolution server 17 with information from which it can identify the router 16 at which the copy of the Information Object is cached, such as the name and/or address of the router 16. In FIG. 1 the router 16, at which the copy of the Information Object is cached, and the name resolution server 17 with which publisher 15 registers the identifier of the Information Object, are both located in the domain 19 of the network operator used by the publisher 15. Registering the identifier of the Information Object with the name resolution server 17 is shown as action 1 in FIG. 1.

While the embodiment of FIG. 1 requires only a single name resolution server, other embodiments (such as those of FIGS. 4 and 5 described below) may use two name resolution servers. To avoid confusion, in these later embodiments the name resolution server 17 with which the publisher 15 registers the identifier of the Information Object is referred to as "Pub NRS 17", and the second name resolution server is referred to as "Global NRS 20". The name resolution server 17 in FIG. 1 is labelled "Pub NRS 17" to provide consistency with these later embodiments.

As described with reference to FIG. 3 below, it is assumed that there is a trust relationship between the publisher 15 and the network operator used by the publisher 15, and it is also assumed that a trust relationship is established between the publisher 15 and the consumer 14. Therefore, as noted above, the router 16 is preferably located in the domain 19 of the network operator used by the publisher 15, and the name resolution server 17 is preferably in the same domain that contains the router 16—ie the name resolution server 17 is preferably also in the domain 19 of the network operator used by the publisher 15. This allows communications to or from the name resolution server 17 and/or the router 16 to be protected by these trust relationships.

After receiving the identifier, $MOV_s$, of the Information Object the name resolution server 17 then instantiates a virtual node 18, for example a virtual router, in the domain 19. A virtual node is a virtual machine with a network stack that is a node in an IP network. Several virtual nodes with separate resources can be implemented on a single physical node. A virtual router is a virtual node that is, or that acts as, a router.

During the action of instantiating the virtual node 18 (action 2 of FIG. 1) the name resolution server 17 also creates a mapping between a temporary identifier $MOV_T$ and the identifier $MOV_s$ of the Information Object, and installs this mapping in the virtual node 18.

According to the present invention, when the name resolution server 17 instantiates the virtual node 18, it instantiates the virtual node 18 such that the mapping between the temporary identifier $MOV_T$ and the identifier $MOV_s$ of the Information Object is arranged to cease upon occurrence of a predetermined event. By saying that the mapping is arranged to "cease", is meant that the mapping becomes ineffective upon the occurrence of the predetermined event, so that knowledge of the temporary identifier $MOV_T$ no longer allows a third party to recover a copy of the Information Object. Further details of this are described below with reference to action 11 of FIG. 1.

At action 3 of FIG. 1, the name resolution server informs the publisher 15 of the temporary identifier $MOV_T$. In the embodiment of FIG. 1, the identifier $MOV_T$ is a temporary identifier for the Information Object that will, when resolved, provide a route to the virtual node 18 that will, in turn, deliver a copy of the Information Object. That is, in this embodiment knowledge of the temporary identifier $MOV_T$ provides access to the Information Object (up to the time where the mapping between the temporary identifier $MOV_T$ and the identifier $MOV_s$ of the Information Object ceases).

At action 4 the publisher 15 advertises that it is prepared to provide copies of the Information Object, and at actions 5 and 6 a consumer 14 who wishes to obtain access rights to the Information Object makes a transaction with the publisher 15, which results in the publisher 15 agreeing to provide the consumer with a copy of the Information Object. It should be noted that not all steps of the transaction between the consumer 14 and the publisher 15 are shown in FIG. 1, and conventional steps such as the publisher 15 authenticating the identity of the consumer 14 or verifying a payment made by the consumer 14 for example by communicating with a credit card provider, are omitted for clarity.

It should be noted that, depending on what information is made available by the publisher 15 at action 4, it may be necessary for the consumer 14 to perform a name or address resolution before the consumer 14 is able to contact the publisher 15. This is omitted from FIG. 1 for clarity, although an example of such a name or address resolution is shown as actions 2 and 3 in FIGS. 4 and 5.

Upon a successful conclusion of the transaction between the consumer 14 and the publisher 15, the publisher 15 forwards the temporary identifier $MOV_T$, to the consumer 14, as action 6.

At action 7 the consumer 14 sends a message to the virtual node 18, requesting a copy of the Information Object. The message includes the temporary identifier $MOV_T$ provided to the consumer 14 by the publisher 15 in action 6. (Details of any resolution carried out on the temporary identifier $MOV_T$ to obtain a locator of the virtual node are omitted from FIG. 1 for clarity, but are included in FIG. 2 to be described below.)

Upon receipt of the request from the consumer 14, the virtual node 18 determines, from the mapping installed therein, the identifier $MOV_s$ of the Information Object, and at action 8 requests a copy of the Information Object from the router 16 at which the publisher 15 cached the copy of the Information Object. At action 9 the router 16 returns a copy of the Information Object to the virtual node 18, and at action 10 the virtual node 18 forwards the copy of the Information Object to the consumer 14.

It should be noted that the method of FIG. 1 assumes that the name resolution server 17 has provided the virtual node 18 with information that allows the virtual node 18 to identify the router 16 at which the Information Object was cached, such as the name and/or address of the router 16. If such information was not installed in the virtual node 18, the virtual node 18 would be required to perform a name or address resolution before virtual node 18 is able to contact the router 16. This is omitted from FIG. 1 for clarity, although an example of such a name or address resolution is shown as actions 8 and 9 in FIG. 6.

As noted above, the publisher 15 desires to restrict access to the Information Object, so that only parties who are granted access rights to obtain a copy of the Information Object, for example who have paid the publisher 15 for the right to obtain a copy of the Information Object, are able to obtain a copy of the Information Object. The virtual node 18 is therefore configured with access rules that lead to the mapping between the temporary identifier $MOV_T$ and the identifier $MOV_s$ ceasing after a predetermined event. Cessation of the mapping is shown as action 11 in FIG. 1.

In the embodiment of FIG. 1 the "predetermined event" which causes cessation of the mapping is the fulfillment by the virtual node 18 of a single request for a copy of the Information Object. If the Consumer 14 should pass the temporary identifier $MOV_T$ to a third party, the third party will not be able to obtain a copy of the Information Object, since the mapping between the temporary identifier $MOV_T$ and the identifier $MOV_s$ no longer exists. (It should be noted that the invention does not require that that the predetermined event which causes cessation of the mapping is the fulfillment of a single request for a copy of the Information Object, and possible variations are described below.)

In one implementation of the invention, the virtual node 18 may be configured, when it is instantiated, such that it self-destructs after having fulfilled one request for a copy of the Information Object in response to a request containing the temporary identifier $MOV_T$. This provides good security against an unauthorised party obtaining a copy of the information object—even if a third party becomes aware of the temporary identifier $MOV_T$ the third party will be unable to obtain a copy of the Information Object since the virtual node no longer exists.

In an alternative implementation, the virtual node 18 may be configured, when it is instantiated, such that the mapping between the temporary identifier $MOV_T$ and the identifier $MOV_s$ terminates after the virtual node 18 has fulfilled one request for a copy of the Information Object but that the virtual node continues to exist. In this implementation a new temporary identifier $MOV_T2$ is created after provision of one copy of the Information Object, and the virtual node 18 is updated by removing the mapping between the original temporary identifier $MOV_T$ and the identifier $MOV_s$ and replacing it by the mapping between the new temporary identifier $MOV_T2$ and the identifier $MOV_s$ of the Information Object. If a third party should become aware of the initial temporary identifier $MOV_T$ the third party would be unable to obtain a copy of the Information Object solely by using the old temporary identifier $MOV_T$, since the mapping between $MOV_T$ and $MOV_E$ is no longer held in the virtual node 18. In this implementation the publisher 15 would need to be informed of the new temporary identifier $MOV_T2$, for example by the name resolution server 17 repeating action 3 for the new temporary identifier $MOV_T2$.

Figure 2:
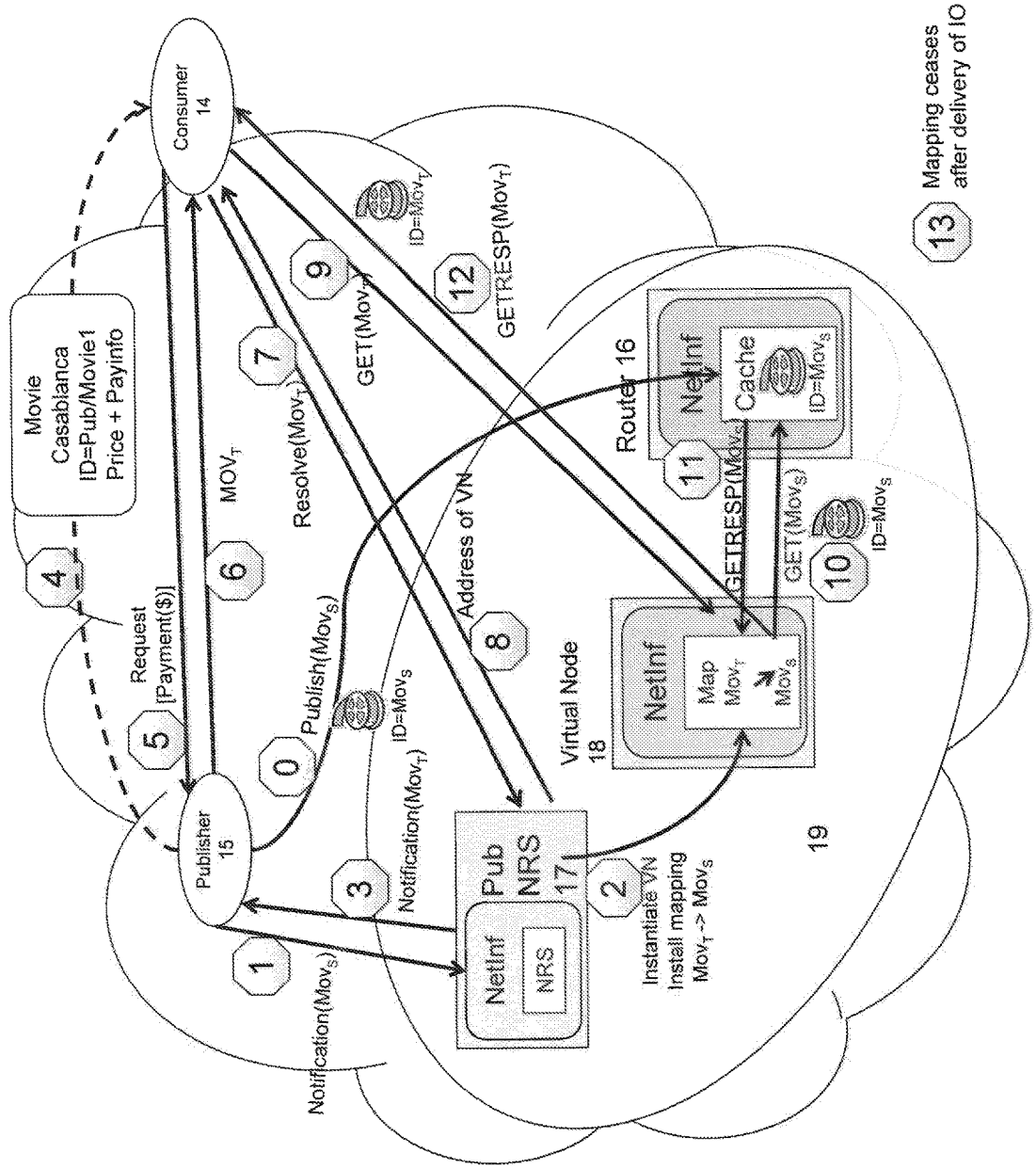
FIG. 2 illustrates a generic network architecture for implementing another embodiment of the present invention.

FIG. 1 provides an overview of the principal steps of an implementation of the present invention. It is, however, likely that any practical implementation of the invention would require additional steps. For example, in FIG. 1 the consumer 14 is shown as being able to communicate directly with the virtual node 18 in action 7, using the temporary identifier $MOV_T$ received from the publisher 15 in action 6. This requires that the temporary identifier $MOV_T$ identifies the name and/or location of the virtual node 18 to sufficient detail to allow the consumer 14 to direct the request for the Information Object to the virtual node 18 in action 7. The invention does not however require that the temporary identifier $MOV_T$ identifies the name and/or location of the virtual node 18, and all that is necessary is that the temporary identifier $MOV_T$ identifies the Information Object. As noted above, if the temporary identifier $MOV_T$ of the Information Object does not also identify the name and/or location of the virtual node 18, a name or address resolution on the temporary identifier $MOV_T$ is required to obtain a locator of the virtual node. FIG. 2 shows a modified embodiment of the present invention which incorporates an additional name resolution process carried out by the consumer 14 in order to be able to direct the request for the Information Object to the virtual node 18—in this embodiment the temporary identifier $MOV_T$ of the Information Object is not required to identify the name and/or location of the virtual node 18.

In the embodiment of FIG. 2, actions 0 to 6 are the same as actions 0 to 6 respectively of the embodiment of FIG. 1, and their description will not be repeated.

Once the consumer 14 has completed the transaction with the publisher 15 and has received the temporary identifier $MOV_T$ in action 6, the consumer 14 then sends a resolution query, which includes the temporary identifier $MOV_T$, to a name resolution server, and this is shown as action 7.

It is likely that only a name resolution server in the domain 19 of the publisher's network operator will be able to resolve the temporary identifier $MOV_T$ and obtain a locator of the virtual node 18, since the temporary identifier was created in the domain 19. FIG. 2 shows the resolution query of action 7 directed to the name resolution server 17 in the domain 19 of the publisher's network operator. The temporary identifier $MOV_T$ therefore preferably identifies, or contains information that can be used to identify, a name resolution server to use to resolve the temporary identifier and obtain a locator of the virtual node. For example the temporary identifier may contain an authority part that makes it possible to use the domain name system (DNS), or a name resolution server, to find out which is the name resolution server 17 of the publisher's network operator.

In response to this query, the name resolution server responds at action 8 of FIG. 2 by providing the consumer 14 with information that allows the consumer 14 to identify, and direct messages to, the virtual node 18, such as the name and/or address of the virtual node 18. The consumer 14 may then use this information to send to the virtual node 18 a request for the Information Object. This is shown as action 9 of FIG. 2, and corresponds to action 7 of FIG. 1.

Actions 10 to 13 of the embodiment of FIG. 2 correspond to actions 8 to 11, respectively, of the embodiment of FIG. 1, and their description will not be repeated.

It will be noted that, in the embodiments of FIGS. 1 and 2, the publisher 15 caches a copy of the Information Object before completing a transaction with the consumer 14. This ensures minimal delay to the consumer obtaining a copy of the Information Object once they have completed the transaction with the publisher 15 at actions 5 and 6 of FIG. 1. In principle, however, it would be possible for the publisher 15 to advertise the Information Object without having cached the Information Object. In this modified embodiment, the publisher 15 would not cache the Information Object until after action 4 of FIG. 1 of advertising the Information Object, or even not until after receiving a request from the consumer 14 for the Information Object at action 5.

The embodiments of FIGS. 1 and 2 provide security against a third party being able to obtain access to the Information Object without authorisation from the publisher 15. In a practical implementation of the present invention, however, it would be desirable for each of the actions shown in FIG. 1 or 2 to be protected as securely as possible. FIG. 3 illustrates a further embodiment of the invention, which is based on FIG. 2 but which describes how the various actions may be provided with further protection.

Figure 3:
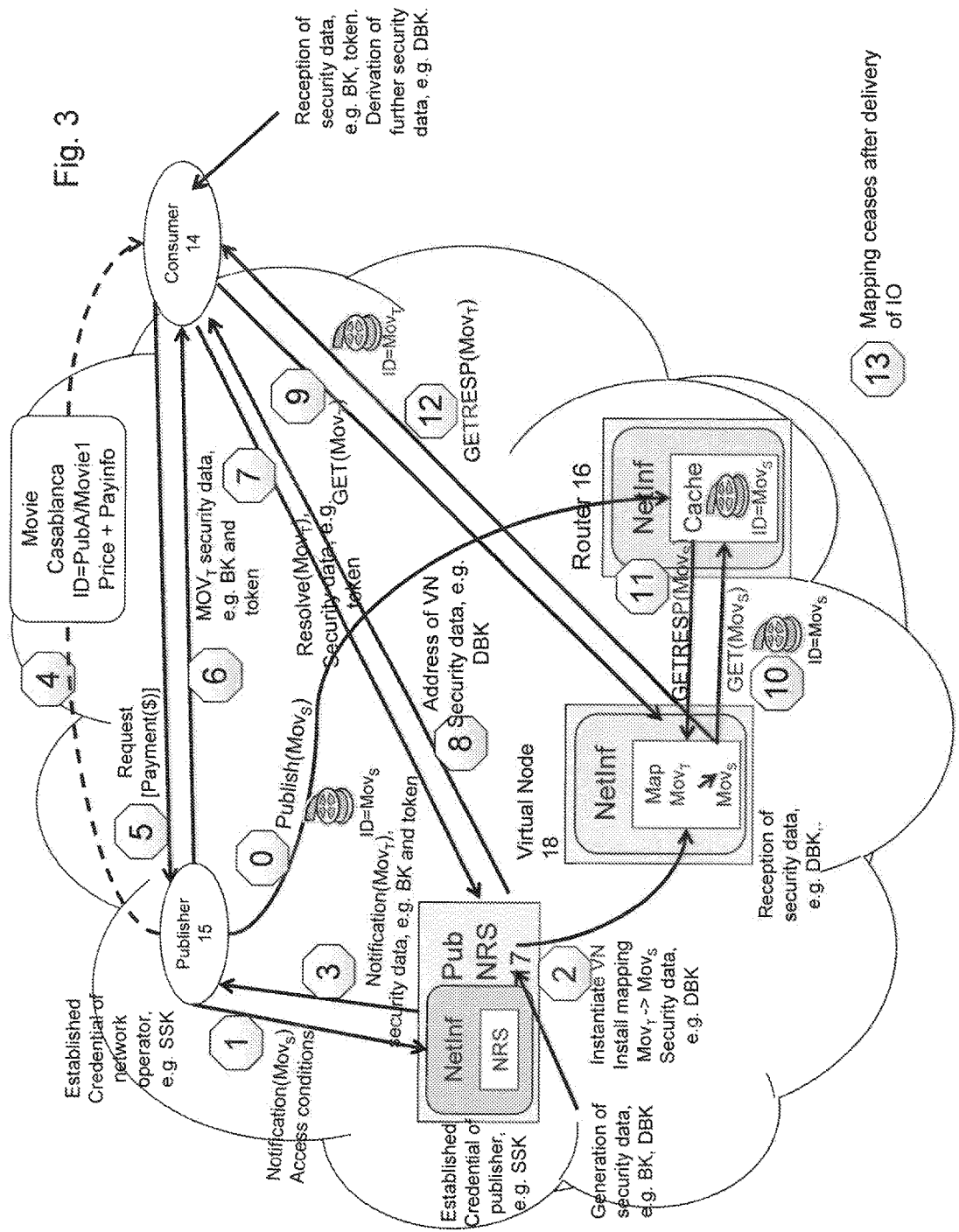
FIG. 3 illustrates a generic network architecture for implementing another embodiment of the present invention.

In the description of the embodiment of FIG. 3 it will be assumed for simplicity that the actions required to implement the present invention involves three parties: The publisher 15, the operator of the publisher's network (hereinafter just "network operator"), and the consumer 14. It will also be assumed that the publisher 15 and the network operator have an established trust relationship that is embodied in established credentials, such as one or more shared secret keys (SSK) or public key certificates exchanged between the publisher 15 and the network operator.

While the consumer 14 and the publisher 15 initially may not have any trust relationship, a trust relationship is defined between the publisher 15 and the consumer 14 as a method according to the present invention is carried out, as a result of the agreement between the consumer 14 and the publisher 15 for the publisher 15 to make a copy of the Information Object available to the consumer.

The consumer 14 and the network operator do not necessarily have any trust relationship, but a transitive trust relationship between the consumer 14 and the network operator can be inferred from the trust relationship between the publisher 15 and the network operator, and the trust relationship between the publisher 15 and the consumer 14.

Possible ways of providing the actions of FIG. 3 with additional protection will now be described, with the numbers referring to the action shown in FIG. 3:

Action 0. The transport of the Information Object between the publisher 15 and the network operator's domain can be protected with any suitable cryptographic system, using the established trust relationship between the publisher 15 and the network operator. For example the transfer of the Information Object to the router 16 may be protected using any suitable secure communication protocol such as SSL/TLS (Secure Sockets Layer/Transport Layer Security) protocol, IPsec (Internet Protocol Security) protocol, SFTP (Secure File Transfer Protocol) or similar protocols in an IP network. The protocol that is used can be authenticated using the credentials that are assumed to have been established between the publisher 15 and the network operator.

Action 1. The notification of the identifier $MOV_s$ of the Information Object sent by the publisher 15 to the name resolution server in action 1 may be protected in a similar manner as described for action 0. The notifications sent by the publisher 15 in action 1 may additionally contain access control policy related information, that specifies one or more conditions for granting access to the Information Object. (For example, the publisher may additionally require that the consumer retrieve the Information Object within a set time period from completion of the transaction, or that the Information Object can only be retrieved after a certain time of day.)

When the name resolution server receives the notification from the publisher 15, the network operator can generate security data associated to the Information Object, for example:

(a) a secret bind key (BK) derived from the credentials shared between the publisher 15 and the network operator and from the identifier $MOV_s$. The bind key BK may for example be derived using a key derivation function KDF, such that $BK=KDF(SSK, MOV_s)$. A suitable key derivation function may for example be one described in the US National Institute of Standards and Technology Special Publication 800-108 "Recommendations for Key Derivation using Pseudorandom Functions".

(b) A token asserting conditions for access to the media, if the publisher 15 sent access control policy information together with the identifier $MOV_s$. This token may be digitally signed by the NRS. Examples of suitable tokens include SAML (Security Assertion Markup Language) tokens, or OAuth access tokens. The OAuth Authorization Framework is described in, for example, the Internet Engineering Task Force Request for Comments RFC 6749 "The OAuth 2.0 Authorisation Framework".

Action 2. This action is an internal operation in the network operator domain, and any suitable technique for protecting such internal operations may be used, for example VPN (virtual private network) techniques.

If a bind key BK is generated, this may also be communicated to the virtual node 18. Alternatively, a double bind key (DBK) may be derived from the bind key and an identifier of the virtual node and communicated to the virtual node 18—the double bind key may be generated according to $DBK=KDF(BK, \$VN)$, where $\$VN$ is an identifier of the virtual node 18, such as its name or locator, and KDF is a key derivation function. (This key derivation function may or may not be the same key derivation function as used to create the bind key BK, although in practice it may be desirable for it to be the same key derivation function to avoid the need to implement two different key derivation functions.)

Action 3. This action may be protected in the same way as described for action 1 above. When the name resolution server 17 returns the temporary identifier $MOV_T$ to the publisher in this action, any security data that the network operator has generated, such as a bind key and/or token, may also be communicated to the publisher 15.

Actions 4-6. These actions may be protected by any suitable protection mechanisms, such as known web-based security techniques, such as transport layer security TLS, that may be applied between the consumer 14 and the publisher 15 to protect payment information sent by the consumer 14 to the publisher 15, and to protect the identifier and any security data returned by the publisher 15 to the consumer 14. Any security data that the network operator has generated, such as a bind key and/or token, may be sent to the consumer with the temporary identifier in action 6.

Action 7. When the consumer 14 communicates with the name resolution server 17 to resolve the temporary identifier $MOV_T$ and obtain a name or locator of the virtual node 18 the request sent by the consumer 14 may be authenticated using the bind key BK that was transmitted to the consumer 14 during the transaction with the publisher 15, in order to ensure that secure communication is established between the consumer 14 and the name resolution server 17. The name resolution server 17 may further verify the request received from the consumer 14—for example if the name resolution server 17 has generated a token as described above, the name resolution server 17 may verify whether the request received from the consumer 14 includes the token, or information derived from the token.

Action 8. The secure information established between the consumer 14 and name resolution server 17 in action 7 may also be used to protect the message returned by the name resolution server to the consumer 14 in action 8. The consumer 14 is, upon reception of name/locator of the virtual node, able to derive the double bind key DBK as described above from this and from the previously received bind key. Alternatively, the consumer may receive the double bind key DBK from the name resolution server, protected as described for the other information in this step.

Action 9. The request sent by the consumer 14 to the virtual node 18 may be authenticated using the double bind key DBK, which the virtual node 18 may acquire as described for action 2.

The consumer 14 and the virtual node 18 thus share the double bind key DBK as a secret key, and can use any security protocol based on secret keys to authenticate and establish secure communication, such as for example transport layer security using pre-shared keys (TLS-PSK).

Actions 10, 11. These actions are again internal actions within the network operator domain 19, and may be protected in any suitable manner as described with reference to action 2 above.

Action 12. The response sent by the virtual node to the consumer 14 in action 12 may again be protected by the secure communication established between the consumer 14 and the virtual node 18 as described with reference to action 9 above.

Figure 4:
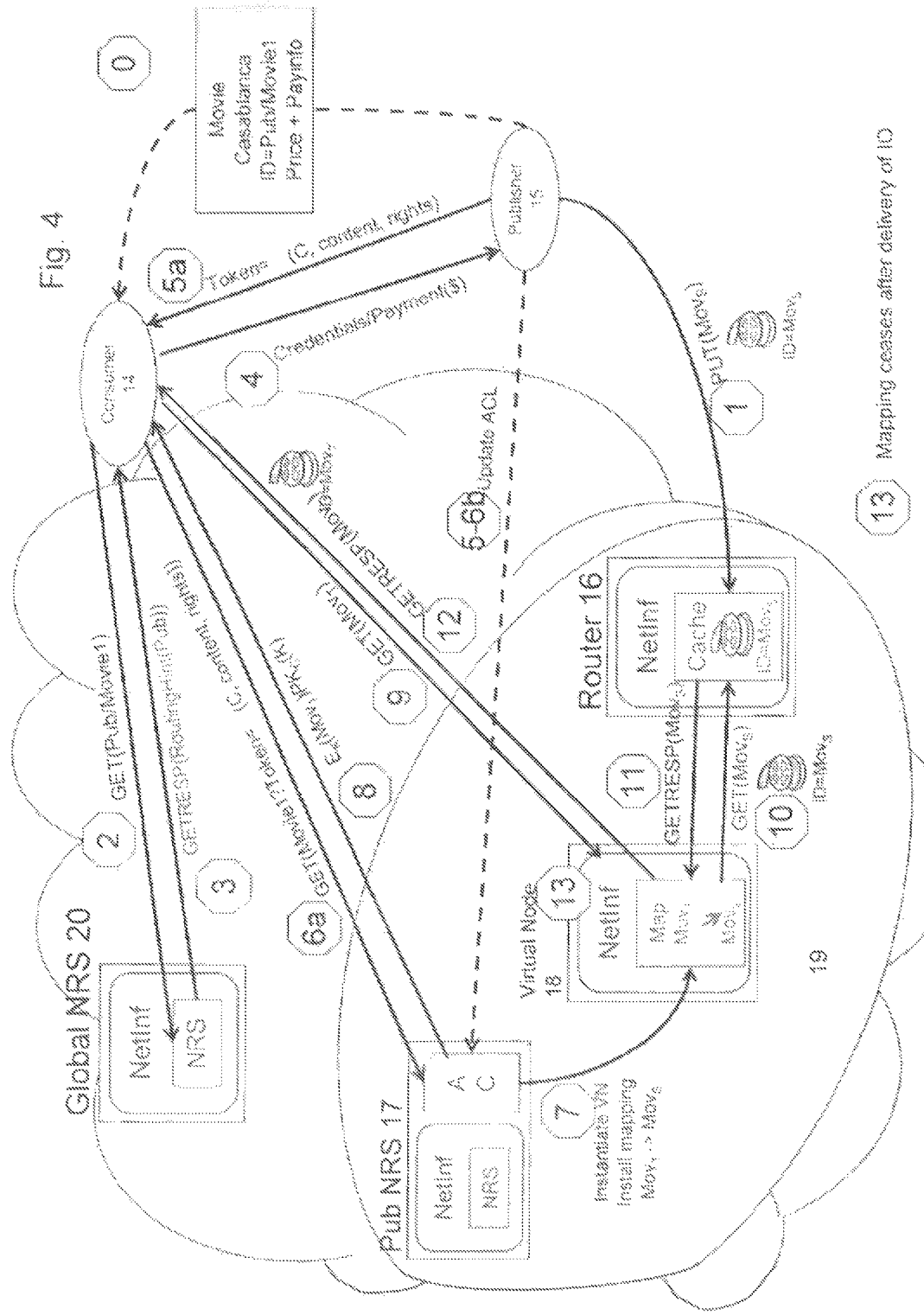
FIG. 4 illustrates a generic network architecture for implementing another embodiment of the present invention.

FIG. 4 is a schematic diagram showing the principal actions of another embodiment of the present invention. This illustrates one possible way in which the embodiments of FIGS. 1-3 may be varied. Features of this embodiment will be described in detail only if they differ from corresponding features of the previous embodiments.

In the embodiments of FIGS. 1 to 3 the virtual node 18 is instantiated before the publisher 15 completes a transaction with the consumer 14, and possibly even before the publisher 15 advertises the Information Object to potential consumers. In the embodiment of FIG. 4, however, the virtual node 18 is not instantiated until after the publisher 15 has completed a transaction with a consumer 14. Thus, in action 6a of FIG. 4 (which is described further below), a consumer 14 who has completed a transaction with the publisher 15 contacts the name resolution server 17 in the network operator's domain, and the name resolution server 17 does not instantiate the virtual node 18 until after it has received the request from the consumer 14.

It should be noted that FIG. 4 shows the publisher 15 as advertising the Information Object to potential consumers (action 0) before the publisher 15 has cached a copy of the Information Object at the router (action 1). The order of these two actions could, however, be interchanged.

Further, as a consequence of the virtual node 18 not having been instantiated at the time when the transaction between the publisher 15 and the consumer 14 is completed, it follows that the publisher 15 cannot provide the temporary identifier $MOV_T$ to the consumer 14, since the publisher 15 is not aware of the temporary identifier—and indeed, the mapping between the temporary identifier $MOV_T$ and the identifier $MOV_s$ of the Information Object may not yet have been created. Accordingly, in the embodiment of FIG. 4, the publisher 15 completes the transaction with the consumer 14 at action 5a by sending the consumer 14 a token that the consumer may then use to obtain a copy of the Information Object. The token will identify the consumer and the Information Object, and may optionally also identify any further access rights imposed by the Publisher 15 (for example the token may be valid only for a predetermined period following the transaction). FIG. 4 shows the token supplied to the consumer 14 as "(C, content, rights)", indicating that the token is generated based on the identity of the consumer ("C"), based on the content and/or identity of the Information Object ("content"), and optionally based on access rights imposed by the Publisher ("rights"). The symbol (" ") before the parenthesis signifies that token comprises a digital signature of this data, signed by the publisher's private key and verified by the network operator and optionally also verified by the consumer using the publisher's public key.

Once the consumer 14 has received the token in action 5a, the consumer then sends a message to the name resolution server 17 of the publisher's network operator requesting the Information Object as action 6a, and includes the token in the message. The publisher 15 also informs the name resolution server 17 of the transaction it has completed with the consumer 14. The publisher 15 may send a copy of the token to the name resolution server 17, although this is not necessary as the digital signature of the publisher can be verified by the name resolution server 17 given the public key of the publisher. The name resolution server 17 has an access control ("AC") function that maintains an access control list (ACL) for the information object and, when the publisher informs the name resolution server of the transaction, the access control function of the name resolution server updates the access control list to indicate that the information object may be supplied to the consumer 14.

Updating the access control list may be done in a number of ways. With the token the access control information is self-contained, i.e. there is no need to update the access control list and the communication between the publisher 15 and the name resolution server 17 in steps 5 and 6b of FIG. 4 is in principle unnecessary. However, it is possible for the publisher to send, for example, information on the identity of the consumer and associated access rights, for example by sending an identifier of an authorized consumer which can be used to authorize setup of transport layer security (TLS) communications. This optional communication between the publisher 15 and the name resolution server 17 is shown as a broken line (actions 5, 6b) in FIG. 4.

When the name resolution server 17 has received the message from the consumer 14 at action 6a and optionally the message from the publisher 15 at action 6b, it can identify the Information Object from the token supplied by the consumer 14, verify the publisher's signature on the token supplied by the consumer 14, and/or authenticate/authorise the request from the consumer 14 against the updated access control list. If the request is authenticated/authorised, the name resolution server 17 then initiates the process of instantiating the virtual node 18, generating the temporary identifier $MOV_T$, and installing the mapping in the virtual node 18. (The process of instantiating the virtual node, action 7, may be as described for the embodiments of FIGS. 1 to 3 above.) The name resolution server 17 can then return the temporary identifier $MOV_T$ to the consumer 14, as action 8 in FIG. 4.

(It should be noted that the embodiment of FIG. 4 (and also the embodiment of FIG. 5, to be described below) could be varied by omitting the token. In this variation, identification of, and access rights for, the consumer would be provided directly to the name resolution server 17 by the publisher 15 in actions 5 and/or 6b. The request from the consumer to the name resolution server 17 at action 6a would identify the Information Object that the consumer wished to obtained, and the name resolution server 17 would check that this request corresponded with access rights it had been notified of by the publisher.)

As explained with reference to FIG. 3, it is preferable that the various messages are protected for additional security, and the messages of the embodiment of FIG. 4 may be protected for example as described above with reference to FIG. 3. This additional protection is generally omitted from FIG. 4 to avoid repetition.

The invention is not however limited to the specific security techniques described with reference to FIG. 3. As an illustration of an alternative technique that may be used, the label "$E_K(Mov_T)PK_c(K)$" in FIG. 4 indicate that the message sent from the name resolution server 17 to the consumer 14 with the temporary identifier $MOV_T$ is protected with object security instead of session security described in FIG. 3, for example by being encrypted using the public key of the consumer 14. For performance reasons the encryption of the identifier $MOV_T$ is performed with a secret symmetric key which is in turn encrypted with a public key ("$PK_c$" in FIG. 4 indicates the public key of the consumer 14, and "K" denotes a symmetric secret key with which the identifier $MOV_T$ is encrypted).

Once the consumer 14 has received the encrypted temporary identifier $MOV_T$, it can decrypt it and then request a copy of the Information Object from the virtual node 18, as described in previous embodiments—and actions 9-12 of FIG. 4 correspond to actions 9-12 of FIG. 2 and their description will not be repeated. After delivery of the copy of the Information Object to the consumer 14 in action 12, the mapping between the temporary identifier $MOV_T$ and the identifier $MOV_s$ of the Information Object ceases at action 13, for example by the mapping terminating or by the virtual node 18 self-destructing.

If the message sent from the name resolution server 17 to the consumer 14 at action 8 with the temporary identifier $MOV_T$ is protected with object security as indicated in FIG. 4 instead of session security described in FIG. 3, this would require corresponding modification to the protection applied in actions 9 and 12—for example the messages sent in actions 9 and 12 may be protected using the symmetric secret key K, as this key is known to the consumer.

In the embodiment of FIG. 4, it is assumed that the information included in the advertisement by the publisher 15 (at action 0 in FIG. 4) does not include enough information for the consumer 14 to be able to contact the publisher 15. In the FIG. 4 the consumer 14 therefore sends a query ("GET(Pub/Movie1") to a name resolution server 20, as action 2, and the name resolution server 20 returns, at action 3, information that will enable the consumer 14 to contact the publisher 15. This information is shown as "RoutingHint (Pub)" in FIG. 4, and may include information relating to the location and/or identity of the publisher 15 and is sufficient to allow the consumer 14 to direct a message to the publisher 15.

The name resolution server 20 that the consumer 14 uses to obtain routing information for the publisher 15 need not be the same name resolution server that is responsible for instantiating the virtual node, and by way of example FIG. 4 shows the query by the consumer 14 at action 2 directed to a name resolution server 20 (labelled "Global NRS" in FIG. 4) that is different to the name resolution server 17 (labelled "Pub NRS" in FIG. 4) responsible for instantiating the virtual node. In principle, there is no need for the name resolution server 20 that the consumer 14 uses to obtain routing information to be in the domain 19 of the network operator of the publisher 15. However, the query in action 2 of FIG. 4 could in principle be sent to the same name resolution server responsible for instantiating the virtual node (that is, to the name resolution server 17 of FIG. 4), for example if the consumer 14 and the publisher 15 share the same network operator.

Figure 5:
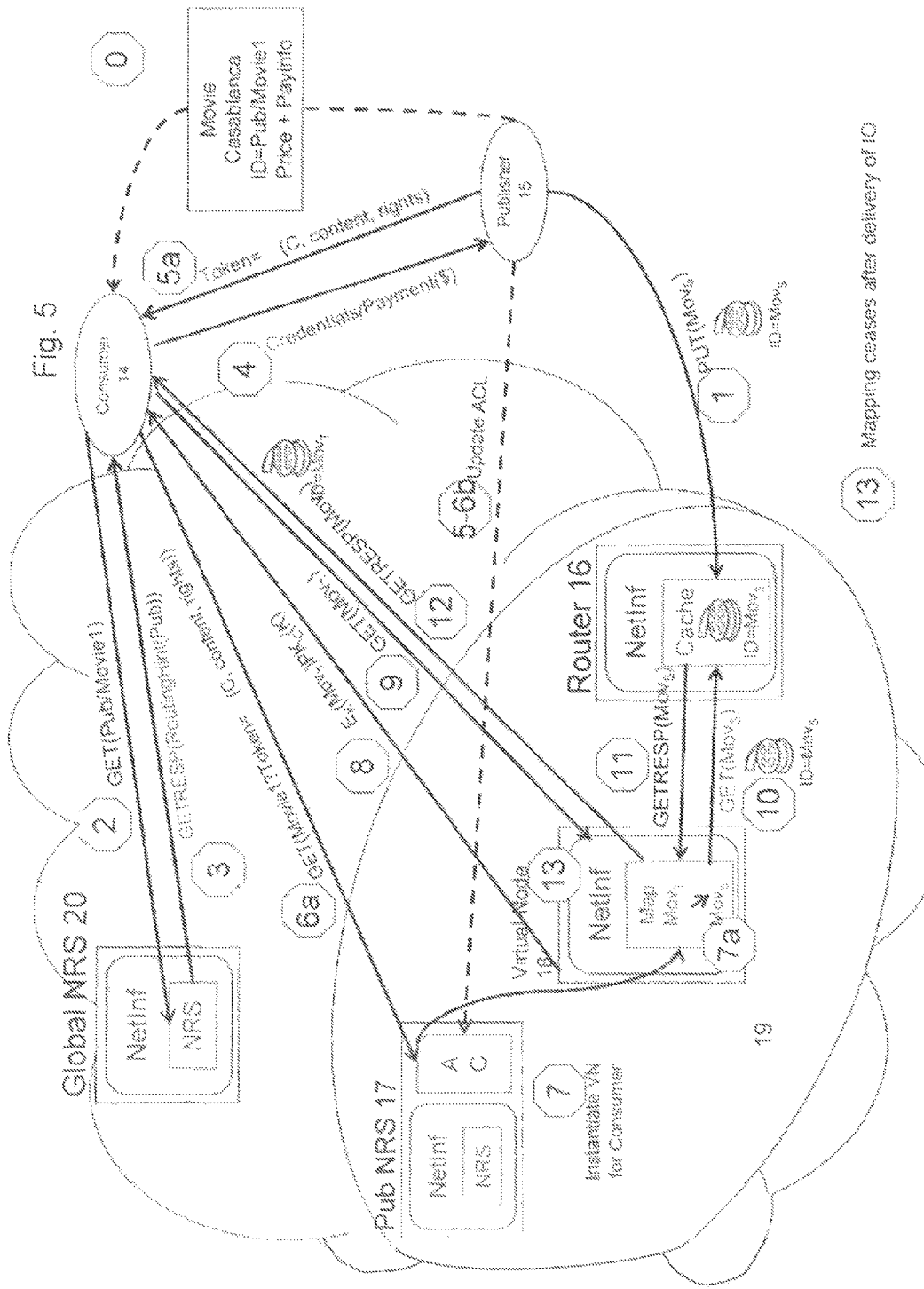
FIG. 5 illustrates a generic network architecture for implementing another embodiment of the present invention.

In the embodiments described above, the mapping between the temporary identifier $MOV_T$ and the identifier of the Information Object $MOV_s$ is generated by the name resolution server 17 that instantiates the virtual node 18. The invention is not, however, limited to this, and it is alternatively possible for the mapping to be generated by the virtual node 18 rather than by the name resolution server 17. This has the advantage that the mapping is known only to the virtual node 18, and restricting knowledge of the mapping to only the virtual node 18 provides further security. FIG. 5 is a schematic diagram showing the principal actions of another embodiment of the present invention, in which the mapping between the temporary identifier $MOV_T$ and the identifier of the Information Object $MOV_s$ is generated by virtual node 18. Features of this embodiment will be described in detail only if they differ from corresponding features of the previous embodiments.

Actions 0 to 6b of the embodiment of FIG. 5 correspond to actions 0 to 6b of FIG. 4, respectively, and their description will not be repeated. (Actions 2 and 3 may be omitted if the information advertised by the publisher 15 in action 0 contains sufficient information for the consumer 14 to contact the publisher 15 as described above.)

In the embodiment of FIG. 5, when the name resolution server 17 in the network operator's domain receives the request from the consumer 14 for a copy of the Information Object, the name resolution server 17 again instantiates a virtual node 18. However, the name resolution server 17 does not generate, or install in the virtual node 18, any mapping between a temporary identifier and the identifier $MOV_s$ of the information object.

When the name resolution server 17 instantiates the virtual node 18 at action 7 of FIG. 5, it provides the virtual node 18 with routing information that will enable the virtual node 18 to contact the consumer 14, such as the name and/or address of the consumer 14. The name resolution server 17 preferably provides the virtual node also with information that will allow the virtual node 18 to establish a secure communication channel with the consumer 14, for example such as the public key of the consumer 14.

The virtual node 18 is preferably created topologically close to the location of the consumer 14, to simplify routing messages to the consumer 14. Once the virtual node 18 has been instantiated, the virtual node 18 generates (action 7a) a temporary identifier $MOV_T$ of the Information Object, and a corresponding mapping between the temporary identifier $MOV_T$ and the identifier $MOV_E$, and registers with a name resolution server. The name resolution server with which the virtual node registers may be any name resolution server with which the virtual node 18 can register, and is not necessarily the name resolution server that instantiated the virtual node (ie need not be the name resolution server 17 of FIG. 5). The mapping is held only by, or in, the virtual node 18, and the name resolution server 17 that instantiated the virtual node is not aware of the mapping. (Even if the virtual node has registered with the same name resolution server 17 that instantiated the virtual node, that name resolution server 17 will, in principle, not know that the $Mov_T$ registration is associated with the virtual node 18 that the name resolution server 17 has just instantiated for $Mov_S$ as it can be assumed that many concurrent instantiations of virtual nodes and registrations are on-going. Thus only the virtual node 18 holds the mapping $Mov_T \rightarrow Mov_S$.) (If desired, the instantiation of the virtual node may not be done directly by the name resolution server 17 but may be done via an intermediary such as a cloud service. This reduces the likelihood that the name resolution server 17 would be able to tell that the $Mov_T$ registration is associated with the virtual node 18, in the event that the virtual node registers with the same name resolution server 17 that was responsible for instantiating the virtual node.)

The virtual node is then able to send the temporary identifier $MOV_T$ to the consumer, as action 8, using the routing information for the consumer 14 provided by the name resolution server with which the virtual node 16 has registered (provision of this routing information is omitted from FIG. 5). The temporary identifier is preferably sent by a secure communication channel, and FIG. 5 shows, by way of example, the temporary identifier being encrypted using the public key of the consumer 14 as described for FIG. 4.

The consumer is then able to obtain a copy of the Information Object by sending a request to the virtual node 18 at action 9. Actions 9-12 of FIG. 5 correspond to actions 9-12 of FIG. 4, and the description will not be repeated. (FIG. 5 assumes that, upon completion of action 8, the consumer is in possession of a locator of the virtual node 18 so that the consumer is able to direct a request for the Information Object to the virtual node at action 9. This requires either that the temporary identifier $MOV_T$ of the Information Object also acts as locator of the virtual node 18, or that the virtual node 18 has provided its locator to the consumer in another way. If, however, the consumer is not in possession of a locator of the virtual node upon completion of action 8, it is necessary for the consumer 14 to perform a resolution on the temporary identifier $MOV_T$ of the Information Object to obtain a locator of the virtual node 18, for example as described with reference to actions 7 and 8 of FIG. 2.) Further protection of the requested Information Object can be provided in action 12 by encrypting the Information Object with the key K that was generated by the virtual node and sent to the consumer in action 8. One example of a suitable protocol to use is the secure real-time transport protocol (SRTP).

Once the copy of the Information Object has been delivered to the consumer 14 as action 12, the mapping ceases, as action 13 in FIG. 5. As noted, this may be achieved by terminating the mapping, or by the virtual node 18 self-destructing.

The above description of the embodiments of FIGS. 4 and 5 indicates that the message sent by the consumer 14 to the name resolution server 17 at action 6a includes the token in the message, and also that the publisher 15 provides the token to the name resolution server 17 in action 6b. In general, however, it is only necessary that information derived from the token is included. For example, the publisher 15 may apply a function (eg a hash function) to the token, and send the result to the name resolution server 17 in action 6b. Provided that the name resolution server 17 is aware of the function, it can verify the request from the consumer 14 by applying the function to the token received from the consumer 14, and determining whether this matches the information supplied by the publisher 15.

Figure 6:
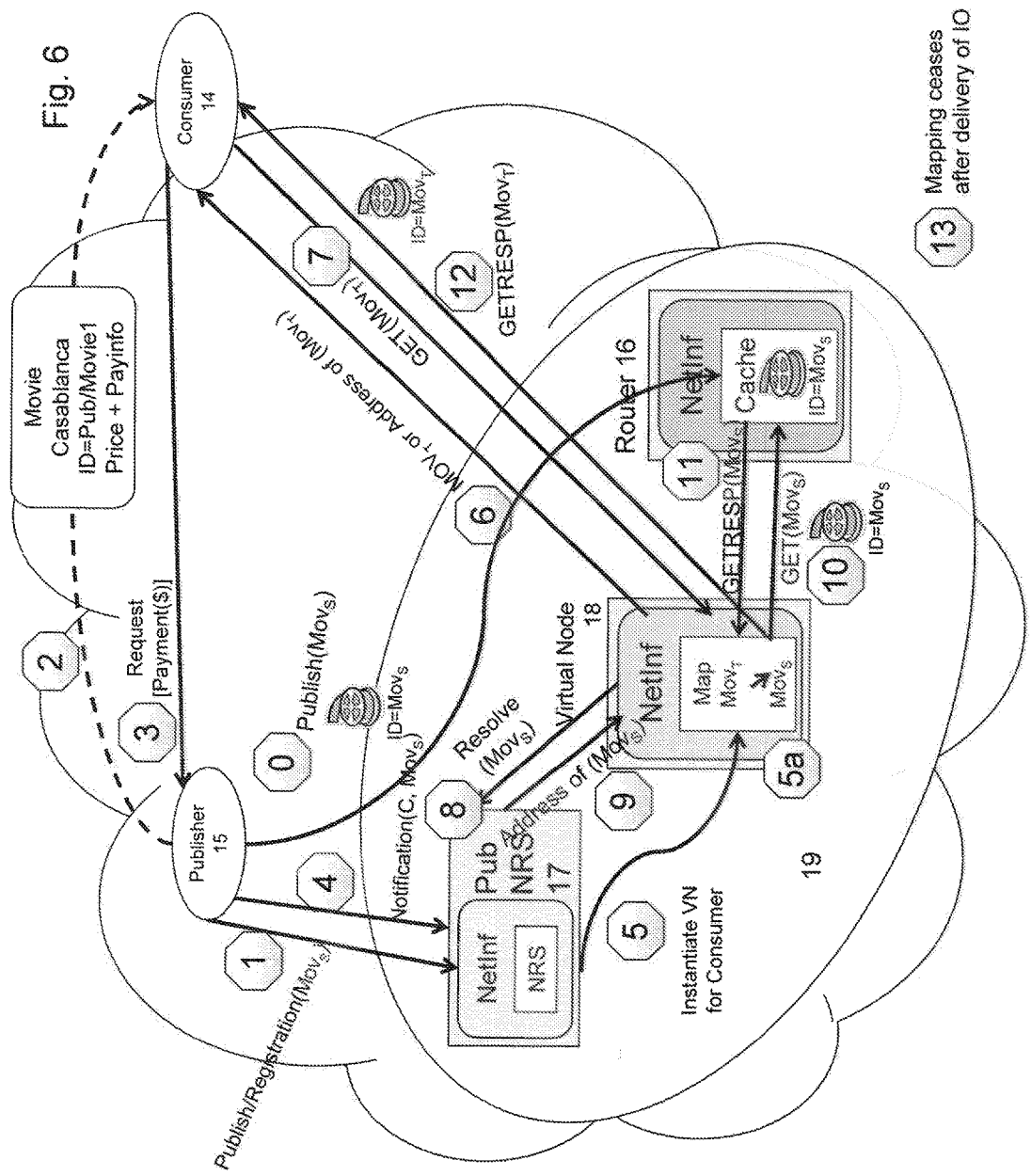
FIG. 6 illustrates a generic network architecture for implementing another embodiment of the present invention.

FIG. 6 is a block schematic diagram illustrating the principal features of a further embodiment of the present invention. This embodiment differs from the previous embodiments in that, when the transaction between the consumer 14 and the publisher 15 is concluded by publisher 15 agreeing to provide the consumer 14 with a copy of the Information Object, information that the consumer 14 needs to obtain a copy of the Information Object is not provided to the consumer 14 by the publisher but is provided to the consumer 14 by another entity (in FIG. 6 by the virtual node 18). Features of this embodiment will be described in detail only if they differ from corresponding features of the previous embodiments.

In this embodiment, the publisher 15 initially caches a copy of the Information Object in the router 16 (action 0), and then notifies the name resolution server 17 in the publisher's network operator's domain of the identifier $MOV_s$ of the Information Objection (action 1 in FIG. 6). At action 2 the publisher 15 advertises the Information Object. These correspond to actions 0, 1 and 4 of FIG. 1. (As explained with regard to embodiment 1, the order of actions 0 and action 2 of FIG. 6 is not critical, and they could occur in a different order to that shown in FIG. 6.)

At action 3 of FIG. 6 the consumer 14 makes a request for a copy of the Information Object, for example makes payment to the publisher 15. This corresponds to action 5 of FIG. 1.

Once the publisher 15 has authenticated the request and payment from the consumer 14, the publisher 15 does not, in contrast to previous embodiments, immediately provide the consumer 14 with information that will allow the consumer to obtain a copy of the Information Object. (If desired, the publisher 15 may send the consumer 14 an acknowledgement that the request for a copy of the Information Object has been accepted, but this is not shown in FIG. 6.) The next action in the embodiment of FIG. 6 is for the publisher 15 to notify the name resolution server 17 that it has agreed to provide the consumer 14 with a copy of the information object. This is shown as action 4 in FIG. 6, and requires the publisher 15 to provide the name resolution server 17 with information that identifies the consumer 14, such as the name and/or address of the consumer 14, and with information identifying the Information Object (for example the identifier $MOV_S$).

The name resolution server 17 then instantiates a virtual node 18, and this is shown as action 5 in FIG. 6. This corresponds to action 7 in FIG. 5, in particular in that the name resolution server 17 does not create a temporary identifier and install a mapping in the virtual node 18, and description of this action will not be repeated.

Instead, the temporary identifier $MOV_T$, and the corresponding mapping between the temporary identifier $MOV_T$ and the identifier $MOV_S$, are generated by the virtual node 18 as action 5a, so that the mapping between the temporary identifier $MOV_T$ and the identifier $MOV_s$ of the Information Object is held only by or within the virtual node 18. Action 5a of FIG. 6 corresponds to action 7a of FIG. 5, and further description will not be repeated.

The virtual node 18 then sends (action 6) to the consumer 14 the temporary identifier, or at least information from which the consumer 14 can derive the temporary identifier, and this corresponds to action 8 of FIG. 5.

The consumer 14 can then send a request for the Information Object to the virtual node 18, and this is shown as action 7 in FIG. 6. This corresponds to action 9 of FIG. 5.

The virtual node 18 can then obtain a copy of the Information Object from the router 16 and return it to the consumer 14, as actions 10, 11 and 12. These correspond to actions 10, 11 and 12 of FIG. 5, and their description will again not be repeated.

In previous embodiments it has been assumed that the virtual node 18 has been able to obtain a copy of the Information Object from the router 16 once it has mapped the received temporary identifier $MOV_T$ onto the identifier $MOV_s$ of the Information Object. This may, however, not always be the case, as knowledge of the identifier $MOV_s$ may not be sufficient for the virtual node 18 to determine the location of the router 16 at which the Information Object is cached. FIG. 6 therefore illustrates a resolution query sent by the virtual node 18 to the name resolution server 17 (action 8), as a result of which the name resolution server 17 supplies the virtual node 18 with a locator for the information object, such as the address of the router 16 at which the Information Object was cached by the publisher. Actions 8 and 9 may be omitted if the virtual node is already aware of the locator of the router 16, for example if the name resolution server 17 provided this when it instantiated the virtual node 18.

It should be noted that a resolution query and a response similar to actions 8 and 9 of FIG. 6 may be required in any other embodiments of the invention, such as those described with reference to FIGS. 1-5 and 7, if the virtual node 18 was not provided with a locator for the information object when it was instantiated by the name resolution server 17.

Finally, once the Information Object has been delivered to the consumer 14, the mapping ceases at action 13. As noted, this may be achieved by terminating the mapping, or by the virtual node 18 self-destructing.

Figure 7:
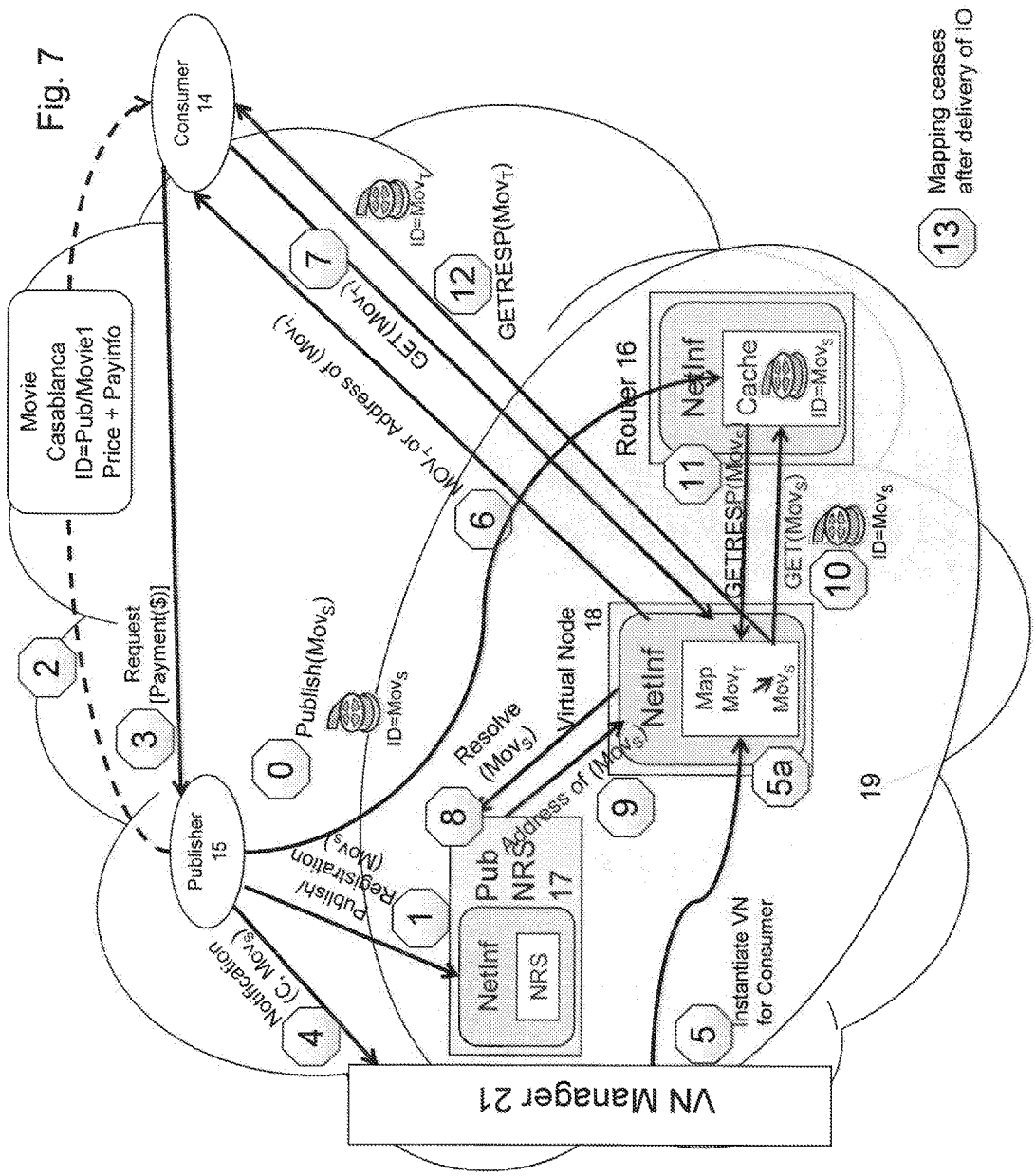
FIG. 7 illustrates a generic network architecture for implementing another embodiment of the present invention.

FIG. 7 shows the principal features of a further embodiment of the present invention. This embodiment corresponds in many ways to the embodiment of FIG. 6, and only the features of FIG. 7 that are different to those of FIG. 6 will be described.

In the embodiment of FIG. 6, when the publisher 15 has authenticated the request and payment 14 from the consumer, it again sends a notification of this as action 4. However, in the embodiment of FIG. 7 this notification is not sent to a name resolution server, but is sent to a Virtual Node manager or "VN manager" 21.

The VN manager 21 then instantiates the virtual node 18, as action 5. This corresponds generally to action 5 of FIG. 6, except that it is performed by the VN manager 21 rather than by the name resolution server 17. In particular, the VN manager does neither create a temporary identifier nor install a mapping in the virtual node 18.

The remaining features of the embodiment of FIG. 7 correspond to the respective features of FIG. 6.

It should be noted that the description of the embodiments of FIGS. 5-7 does not generally describe how messages sent at various stages of these embodiments may be cryptographically protected for additional security. Appropriate cryptographic protection techniques as described with reference to FIG. 3 and/or FIG. 4 may preferably be applied to the various messages sent in the embodiments of FIGS. 5-7, and the description of the possible protection mechanisms will not be repeated.

In the embodiments described above the mapping between the second identifier $MOV_T$ and the identifier $MOV_S$ is described as ceasing upon delivery of the information object. The mapping may in principle cease once the virtual node has transmitted a copy of the information object to the consumer. For example the virtual node 18 is, in a practical implementation, likely to transmit the copy of the information object in a message that contains a field indicating the end of the message (such as an "End of File" field), and the mapping could cease once this field had been transmitted as this would indicate that the information object has been sent. Alternatively, in a practical implementation of the invention it is likely that the consumer 14 would send an acknowledgement to the virtual node 18 when the consumer 14 has received the copy of the information object—for example the consumer 14 may send an acknowledgement to the virtual node 18 when the consumer 14 has received the field indicating the end of the message (such as the "End of File" field), and when the virtual node receives this acknowledgement it knows that the copy of the Information Object has been received by the consumer. In such a case, it could be preferable for the mapping to cease upon receipt by the virtual node 18 of this acknowledgement.

In the embodiments described above, a copy of the information object is supplied to the party who requested it (ie to the consumer 14) by the router 16 sending a copy of the information object to the virtual node 18 and by the virtual node 18 forwarding the copy to the consumer 14. In principle, however, the router 16 could forward a copy of the information object to the consumer 14 via a route that did not involve the virtual node 18. This would be possible if the virtual node 18 supplied the router 16 with information, such as the name and/or address of the consumer, that allowed the router 16 to send a copy of the information object to the consumer 14 via a route that did not involve the virtual node 18. In such an embodiment, actions 9 and 10 of FIG. 1, for example, would be replaced by the router 16 sending a copy of the information object to the consumer 14. In such an embodiment the mapping could in principle cease once the virtual node 18 has requested the router 16 to send a copy of the information object to the consumer 14, or alternatively could cease once the virtual node 18 received confirmation (either direct from the consumer 14 or via the router 16) that the consumer has received the information object.

In the embodiments described above, the event that causes the mapping between the temporary identifier $MOV_T$ and the identifier $MOV_s$ to cease (for example by the destruction of the virtual node 18, or by the termination of the mapping and the installation of a new mapping in the virtual node 18) is the fulfillment of one request to supply a copy of the Information Object. This may however be resource-intensive, and in another implementation the virtual node 18 is instantiated such that the mapping is arranged to cease (for example by the destruction of the virtual node 18 or by the termination of the mapping and the installation of a new mapping in the virtual node 18) after fulfillment of multiple requests for a copy of the Information Object. For example, if there is high demand for the Information Object it is likely that multiple requests for the Information Object will be received in a very short time. Thus, arranging for the mapping to cease after the virtual node 18 has fulfilled a predetermined number of requests for a copy of an Information Object, where the number is greater than 1, should still provide adequate protection against unauthorised access to the Information Object.

In embodiments where the mapping is arranged to cease after the virtual node 18 has fulfilled a predetermined number of requests for a copy of an Information Object, it may be arranged for the virtual node to cache a copy of the Information Object after it has retrieved the copy from the router 16 in response to the first request for the Information Object. This avoids the need for the virtual node 18 to communicate with the router 16 in response to every request. If a copy of the Information Object is cached at the virtual node 18, the cache should be cleared after the virtual node 18 has fulfilled the predetermined number of requests for a copy of the Information Object (unless the virtual node is arranged to terminate once it has fulfilled the predetermined number of requests for a copy of the Information Object, as termination of the virtual node will destroy any copy of the Information Object cached at the virtual node and a separate action of clearing the cache is not required).

Indeed, even if the mapping is arranged to cease after the virtual node 18 has fulfilled a single request for a copy of an Information Object, it may be arranged for the virtual node to cache a copy of the Information Object—if the first attempt to deliver the copy of the Information Object fails, the virtual node can use the copy of the Information Object that it has cached to make a further attempt to deliver a copy of the Information Object to the consumer, this avoiding the need to request a further copy of the Information Object from the router 16. If a copy of the Information Object is cached at the virtual node 18, the cache should again be cleared after the virtual node 18 has fulfilled the request for a copy of the Information Object (unless the virtual node is arranged to terminate once it has fulfilled the request for a copy of the Information Object, since termination of the virtual node will destroy any copy of the Information Object cached at the virtual node and a separate action of clearing the cache is not required).

In the embodiments described above, the virtual node is instantiated after the publisher 15 has cached the information object and has advised the name resolution server 17 or the virtual node manager 21 of the identifier $MOV_E$ of the information object. In principle however it would be possible for the virtual node 18 to be instantiated proactively by the name resolution server 17 or the virtual node manager 21, ie for the name resolution server 17 or the virtual node manager 21 to instantiate a virtual node 18 and create the temporary identifier $MOV_T$ before it has been informed of the identifier $MOV_S$ of the information object by the publisher 15. In such an embodiment the virtual node 18 would be instantiated and then held idle until the publisher 15 informs the name resolution server 17 or the virtual node manager 21 of the identifier $MOV_S$ of the information object. The virtual node 18 is then activated, and the mapping between $MOV_T$ and $MOV_s$ is then generated (either by the name resolution server or by the virtual node). The method then proceeds as described in the embodiments above.

As a further alternative, the virtual node 18 may be instantiated such that the mapping is arranged to cease (for example by the destruction of the virtual node 18 or by the termination of the mapping and the installation of a new mapping in the virtual node 18) after a predetermined time has elapsed since the creation of the virtual node 18. If this time is long enough to allow multiple requests to be fulfilled by the virtual node 18, but is not so long that the temporary identifier $MOV_T$ can be widely circulated to parties who have not been authorised by the publisher 15 to access the Information Object, this can again provide good security against unauthorised access while avoiding the need to recreate the mapping every time that a copy of the Information Object is provided to a consumer.

In the embodiments described above the Information Object is shown as being cached directly by the publisher 15. The invention does not require this, however, and it is sufficient that the publisher 15 arranges for the Information Object to be cached in a router 16—for example the publisher 15 may instruct another node (such as a depository that contains the Information Object) to cache the Information Object at the router 16.

Furthermore, the publisher 15 has been described above as a single entity. However, the publisher of the information object may engage a broker to advertise the Information Object on behalf of the publisher and make a transaction with a consumer.

Figure 8:
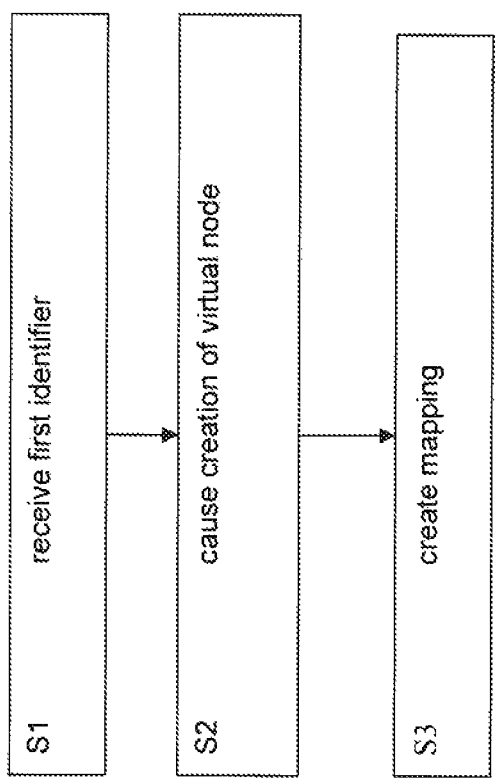
FIG. 8 is a block flow diagram of a method according to the present invention.

FIG. 8 is a block flow diagram showing principal steps carried out at a network node such as a name resolution server (for example the name resolution server 17 responsible for instantiating a virtual node in the embodiments of FIGS. 1 to 6) or at a virtual node manager 21 (such as the virtual node manager 21 of FIG. 7). Initially at S1 of FIG. 8, the network node receives a first identifier associated with an Information Object that has been cached at a node in an ICN. The first identifier may be received from, for example, a publisher of the Information Object.

The node then, at S2 of FIG. 8, instantiates a virtual node. The virtual node may for example be a virtual router, and is to hold a mapping between a second identifier that is assigned to a copy of the Information Object and the first identifier. The network node causes creation of the virtual node such that the mapping between the second identifier and the first identifier is arranged to cease after a predetermined event.

The network node may optionally assign the second identifier to the copy of the Information Object, and create, at S3 of FIG. 8, the mapping between the second identifier and the first identifier. It should, however, be noted that S3 is not required in embodiments in which the second identifier is assigned, and the mapping is created, by the virtual node.

Figure 9:
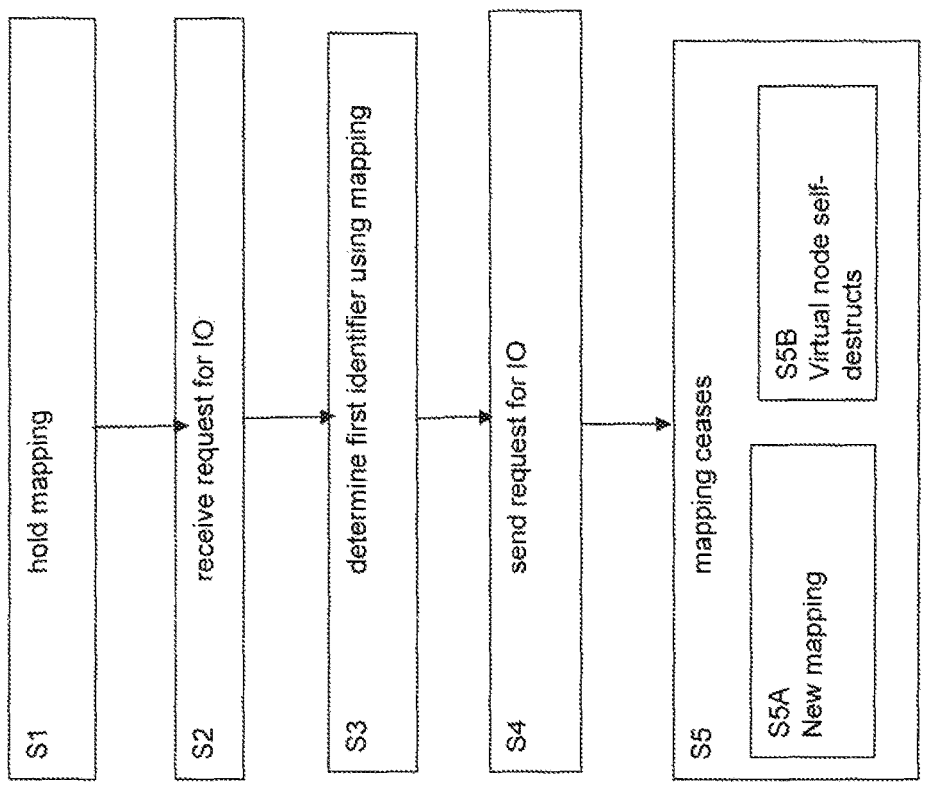
FIG. 9 is a block flow diagram of a method according to the present invention.

FIG. 9 is a block flow diagram showing the principal steps carried out at a virtual node in a method of the present invention, for example at the virtual node 18 of FIGS. 1 to 7. After the virtual node has been instantiated, the virtual node holds, at S1, a mapping between a second identifier that is assigned to a copy of an Information Object that is stored in an ICN and a second identifier that is associated with the Information Object.

At S2 of FIG. 9 the virtual node receives a request from a requesting party for a copy of the Information Object. The request includes the second identifier.

At step S3 of FIG. 9 the virtual node determines the first identifier from the received second identifier and from the mapping held at the virtual node.

Once the first identifier has been determined, the virtual node then sends, at S4 of FIG. 9, a request for the Information Object. This is sent to a node in the ICN at which the Information Object has been cached.

Once the request for the Information Object has been fulfilled, the mapping ceases at S5 of FIG. 9. This may for example comprise the virtual node continuing, but with the current mapping held in the virtual node replaced by a new mapping involving a new temporary identifier (S5A in FIG. 9). Alternatively it may comprise the virtual node self-destructing (S5B in FIG. 9).

The virtual node may receive a copy of the Information Object in response to the request at S4, and if so may send this to the requesting party. It is in principle, however, possible that the node at which the Information Object is cached will send the copy of the Information Object to the requesting party via a route that does not involve the virtual node.

Figure 10:
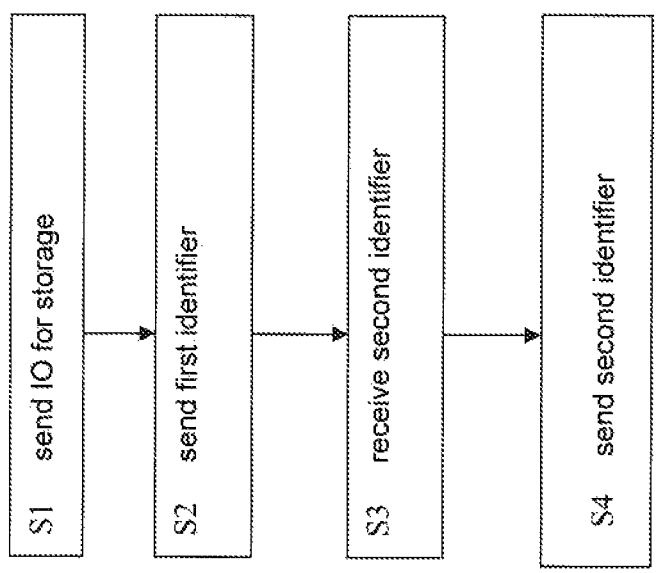
FIG. 10 is a block flow diagram of a method according to the present invention.

FIG. 10 is a block flow diagram showing the principal steps of a method of the present invention as carried out at a publisher node or at a broker node acting on behalf of a publisher. At S1 of FIG. 10, a publisher or broker node sends a copy of an Information Object for storage at a first node in an ICN, such as the router 16 of FIG. 1, or arranges for a copy of the Information Object to be sent for storage at the first node (for example by instructing another node to send a copy of the Information Object for storage at the first node). The publisher or broker node then sends, at S2 of FIG. 10, a first identifier, that is associated with the Information Object, to a second node in the ICN. The second node may, for example, be a name resolution server. The publisher or broker node then receives, at S3 of FIG. 10, a second identifier, that is the subject of a mapping between the second identifier and the first identifier. The second identifier may be received from the network node to which the first identifier is sent in S2 of FIG. 10.

The publisher or broker node may then complete a transaction with a consumer, as a result of which the publisher or broker node agrees to supply the consumer with a copy of the Information Object. The publisher or broker node can then, at S4 of FIG. 10, send the second identifier to the consumer, or arrange for the second identifier to be sent to the consumer.

Figure 11:
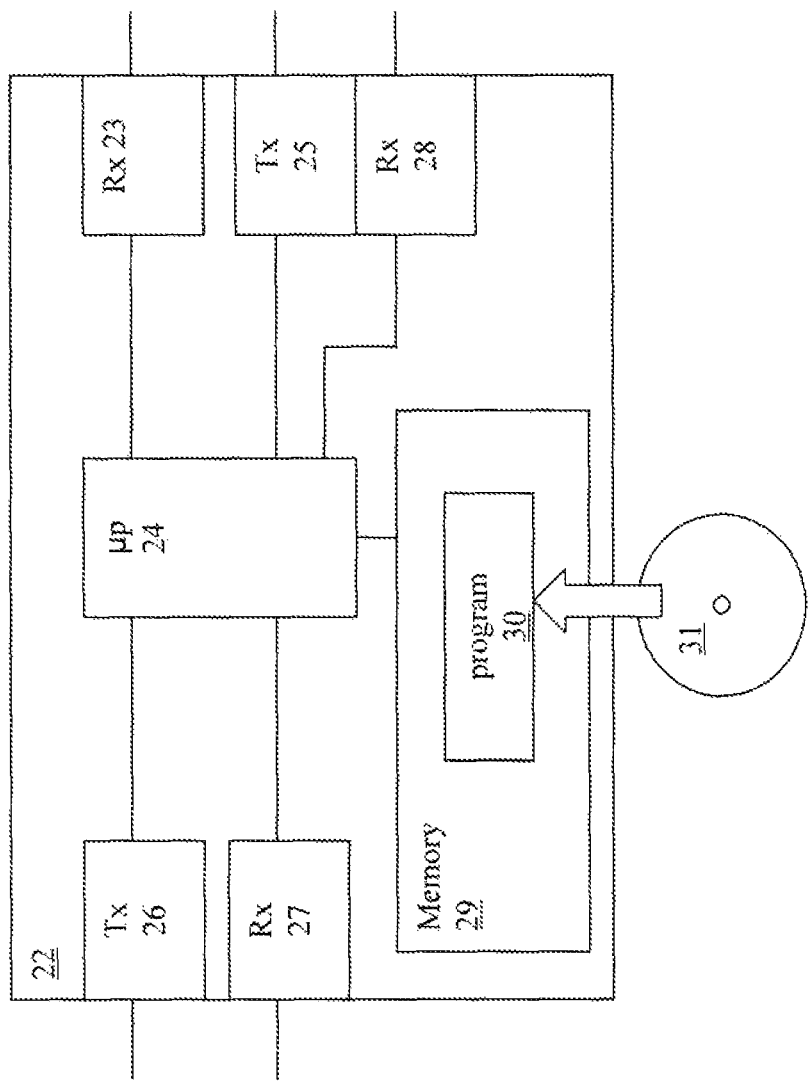
FIG. 11 is a schematic block diagram of a node according to the present invention

FIG. 11 shows an exemplary node 22 for controlling access to an information object in an ICN. The node may for example be a name resolution server such as the name resolution server 17 or a virtual node manager.

The node 22 is provided with a first receiver 23 for receiving, for example from a publisher, a first message that includes a first identifier associated with an information object, such as an information object that has been cached at a node within the ICN. A processor 24 determines that a virtual node is to be created, and arranges to instantiate the virtual node. The processor 24 may optionally assign a second identifier to the information object and generate a mapping between the second identifier and the first identifier, and in such an embodiment the node 22 may comprise a first transmitter 25 for forwarding the mapping to the virtual node. The node 22 may further comprise a second transmitter 26 for transmitting a message to the publisher, for example a message including the second identifier. A second receiver 27 may be provided for receiving a message from a consumer, such as a message requesting a copy of the information object (for example action 6a of FIG. 5). A third receiver 28 may be provided for receiving message from the virtual node, such as address resolution messages (for example action 8 of FIG. 6). It should be noted that the description above of transmitters and receivers is of functional components. These may be embodied in one or more physical transceivers.

The node 22 may also be provided with a non-transitory computer readable medium in the form of a memory 29 that can be used to store data and a computer program 30. The computer program 30, when executed by the processor 24, causes the node 22 to behave as described above. Note also that an external carrier medium 31, for example a non-transitory carrier medium, such as a flash drive, a Compact Disk or a DVD may be used to store the computer program 30.

Figure 12:
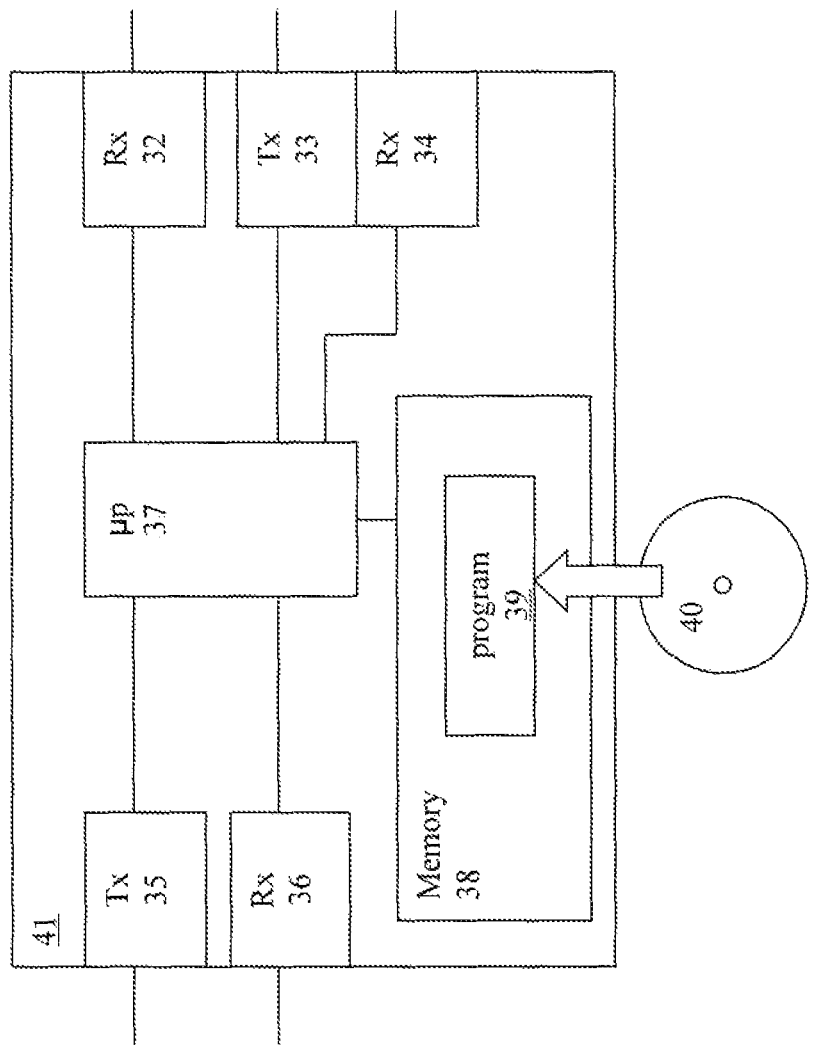
FIG. 12 is a schematic block diagram of another node according to the present invention.

FIG. 12 shows a further node 41 such as virtual node that may comprise the virtual node 18 as used in embodiments of the invention. For the sake of illustration, the following description refers to this node 41 as a virtual node ("VN"), but it will be appreciated that the same functions may be provided in any virtual node that hold mapping information in the manner described above.

The VN 41 is provided with a first receiver 32 for receiving one or more messages from a node that caused instantiation of the VN 41, such as a name resolution server or a VN manager. In embodiments in which the VN 41 receives the mapping between the second identifier and the first identifier, for example from a name resolution server, this mapping may be included in one or more messages received at the first receiver 32. A second receiver 34 is provided for receiving one or more messages from a consumer such as the consumer 14. A message sent by the consumer 14 requesting a copy of the information object and including the second identifier would be received at the second receiver 34. The VN further includes a first transmitter 33 for transmitting one or more messages to a consumer such as the consumer 14, and a message sent to the consumer 14 including the requested information object would be sent via the first transmitter 33. A second transmitter 35 is provided for sending a message to a node in the ICN where the information object is cached, such as the router 16, the message requesting a copy of the information object, and a third receiver 36 is provided for receiving a copy of the information object from the router 16. (In embodiments where the information object is sent from the router 16 to the consumer via a route that does not involve the VN, the first transmitter 33 and the third receiver 36 could in principle be omitted.) A processor 37 is provided to control the messages described above to implement the present invention, and in particular to cease the mapping when required. The processor may also control generation of the mapping between the second identifier and the first identifier, in embodiments where this is done in the VN.

It should be noted that the description above of transmitters and receivers is of functional components. These may be embodied in one or more virtual transceivers.

The VN 41 may also be provided with a non-transitory computer readable medium in the form of a memory 38 that can be used to store data and a computer program 39. The mapping between the second identifier and the first identifier may be held in the memory 38, or alternatively the mapping may be held in a second memory (not shown) within, or accessible by, the VN 41. The computer program 39, when executed by the processor 37, causes VN 41 to behave as described above. Note also that an external carrier medium 40 such as a flash drive, a Compact Disk or a DVD may be used to store the computer program 39.

Figure 13:
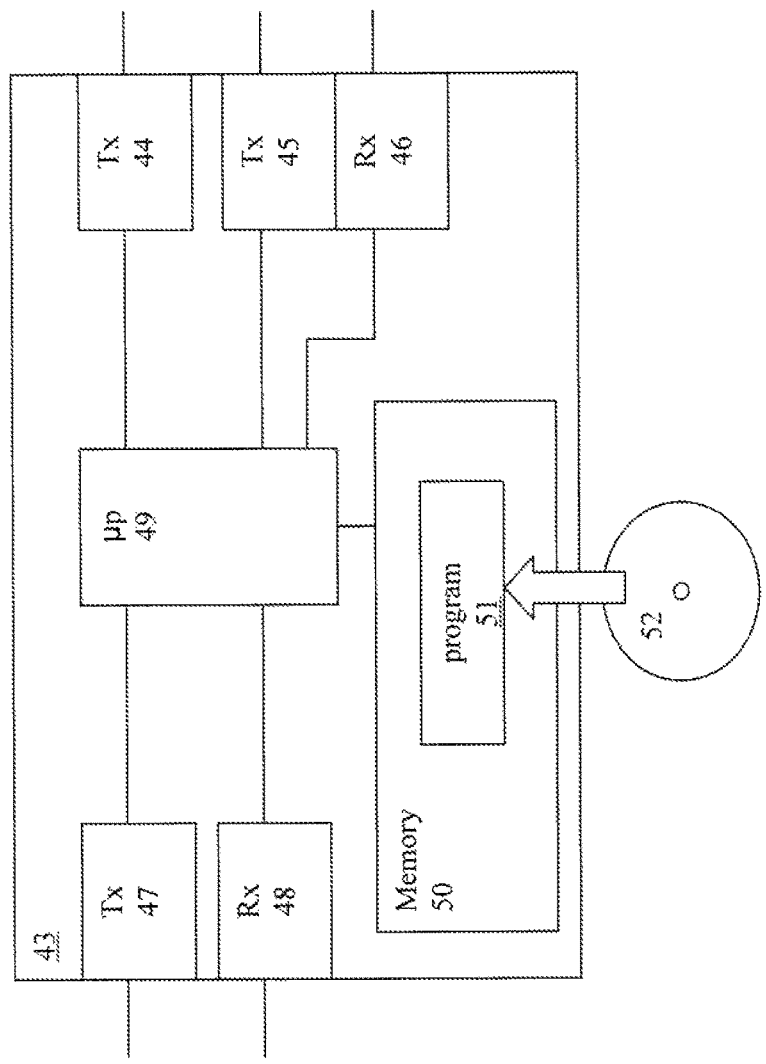
FIG. 13 is a schematic block diagram of another node according to the present invention.

FIG. 13 shows a further node 43 such as publisher or broker node that may comprise the publisher 15 as used in embodiments of the invention. For the sake of illustration, the following description refers to this node 43 as a PN ("publisher node"), but it will be appreciated that the same functions may be provided in another entity.

The PN 43 is provided with a first transmitter 44 for transmitting a first message to a first node in an ICN such as the router 16, the message including a copy of an information object that the PN 43 wishes to cache at the router 16. The PN 43 further includes a second transmitter 45 for transmitting a message to a second node such as a name resolution server informing the second node that the information object has been cached at the router 16. A first receiver 46 is provided for receiving a message from the second node informing the PN 43 of the second identifier assigned to the information object. The PN further includes a second receiver 48 for receiving a message from a consumer, such as consumer 14, who wishes to obtain a copy of the information object, and a third transmitter 47 for transmitting a message to the consumer that includes the second identifier or (for example in the embodiment of FIG. 5) a token that identifies the information object.

It should be noted that in embodiments where the PN 43 is not informed of the second identifier the first receiver may be omitted. In embodiments where the PN 43 is further required to communicate with a VN Manager as well as a name resolution server, the PN 43 may include a fourth transmitter (not shown) for transmitting a message to the VN Manager.

A processor 49 is provided to control the PN to implement the present invention, and to control the messages described above.

It should be noted that the description above of transmitters and receivers is of functional components. These may be embodied in one or more physical transceivers.

The PN 43 may also be provided with a non-transitory computer readable medium in the form of a memory 50 that can be used to store data and a computer program 51. The computer program 51, when executed by the processor 49, causes the PN 43 to behave as described above. Note also that an external carrier medium 52 such as a flash drive, a Compact Disk or a DVD may be used to store the computer program 51.

The invention claimed is:

1. A network node for controlling access to an information object in an information centric network (ICN), the network node adapted to:
receive a first identifier associated with the information object from a publisher or broker of the information object;
cause creation of a virtual node in the ICN in response to receiving the first identifier, the virtual node containing a mapping between a second identifier and the first identifier, the second identifier assigned to a copy of the information object, the copy of the information object stored in the ICN, wherein the virtual node is a virtual machine with a network stack that acts as a node in the ICN and the mapping between the second identifier and the first identifier is arranged to cease after a predetermined event;
receive a request identifying the information object; and
in response to the request, transmit information identifying the virtual node.

2. A network node as claimed in claim 1 and adapted to:
assign the second identifier to the copy of the information object; and transmit the second identifier to the publisher or broker.

3. A network node as claimed in claim 2 and adapted to:
generate authentication information based on access control information for the information object and transmit the authentication information to the publisher or broker with the second identifier; and
determine whether the request identifying the information object also contains the authentication information or information derived therefrom, and transmit the information identifying the virtual node only upon a positive determination.

4. A network node as claimed in claim 3 and adapted to receive the access control information with the first identifier.

5. A virtual node for controlling access to an information object in an information centric network (ICN), the virtual node operating as a virtual machine having a network stack in the ICN, a first identifier being associated with the information object, the virtual node being adapted to:
hold a mapping between a second identifier and the first identifier, the second identifier being assigned to a copy of the information object, the copy of the information object stored in the ICN;
receive, at the virtual node, a request from a requesting party for a copy of the information object, the request including the second identifier, and determine the first identifier using the mapping and send a request for a copy of the information object to a second node in the ICN; and
upon completion of a predetermined event, terminate the mapping between the second identifier and the first identifier.

6. A virtual node as claimed in claim 5 and adapted to receive the mapping between the second identifier and the first identifier from a name resolution server.

7. A virtual node as claimed in claim 5 and adapted to generate the mapping between the second identifier and the first identifier.

8. A virtual node as claimed in claim 5, and adapted to, upon receipt at the virtual node of a copy of the information object from the second node, forward the copy of the information object from the virtual node to the requesting party.

9. A virtual node as claimed in claim 6 and adapted to receive, from the name resolution server, authentication information relating to the second identifier; and wherein the virtual node is adapted to determine whether the request for the copy of the information object includes the authentication information or information derived therefrom, and to send the request for a copy of the information object to the second node only in the event of a positive determination.

10. A virtual node as claimed in claim 5 and adapted to cease the mapping between the second identifier and the first identifier by receiving, from the name resolution server, a mapping between a third identifier and the first identifier, the third identifier being different to the second identifier and being assigned to the copy of the information object by the name resolution server.

11. A virtual node as claimed in claim 5 wherein the predetermined event is the fulfillment by the virtual node of a predetermined number of requests for the information object or receipt at the virtual node of a predetermined number of acknowledgements of receipt of an end-of-file message.

12. A virtual node as claimed in claim 5 wherein the predetermined event is the elapse of a predetermined period of time after creation of the virtual node.

13. A network node as claimed in claim 1 wherein the predetermined event is the fulfillment by the virtual node of a predetermined number of requests for the information object or receipt at the virtual node of a predetermined number of acknowledgements of receipt of an end-of-file message.

14. A network node as claimed in claim 1 wherein the predetermined event is the elapse of a predetermined period of time after creation of the virtual node.

* * * * *